(12) United States Patent
Geyer et al.

(10) Patent No.: US 10,995,209 B2
(45) Date of Patent: May 4, 2021

(54) IMPREGNATING RESIN COMPOSITION, RESIN COATING, LAMINATE CONTAINING SAME, IMPREGNATION PRODUCT, AND METHOD FOR PRODUCING SAME

(71) Applicant: Fritz Egger GmbH & Co. OG, St. Johann in Tirol (AT)

(72) Inventors: Andreas Geyer, Krems (AT); Holger Heinrich, Benz (DE)

(73) Assignee: FRITZ EGGER GMBH & CO. OG, St. Johann in Tirol (AT)

( * ) Notice: Subject to any disclaimer, the term of this patent is extended or adjusted under 35 U.S.C. 154(b) by 0 days.

(21) Appl. No.: 16/300,185

(22) PCT Filed: May 5, 2017

(86) PCT No.: PCT/EP2017/060746
§ 371 (c)(1),
(2) Date: Apr. 26, 2019

(87) PCT Pub. No.: WO2017/194397
PCT Pub. Date: Nov. 16, 2017

(65) Prior Publication Data
US 2019/0256702 A1    Aug. 22, 2019

(30) Foreign Application Priority Data

May 9, 2016    (DE) ............... 10 2016 108 549.9

(51) Int. Cl.
| | |
|---|---|
| *B32B 27/26* | (2006.01) |
| *C08L 61/28* | (2006.01) |
| *B32B 27/42* | (2006.01) |
| *C08K 5/1515* | (2006.01) |
| *C08K 5/17* | (2006.01) |
| *C08K 5/357* | (2006.01) |
| *C08K 5/42* | (2006.01) |
| *C08K 5/521* | (2006.01) |
| *C08L 71/02* | (2006.01) |
| *C08L 79/02* | (2006.01) |
| *C08G 73/02* | (2006.01) |
| *C08G 12/32* | (2006.01) |
| *B32B 27/10* | (2006.01) |
| *B32B 27/12* | (2006.01) |

(52) U.S. Cl.
CPC .............. *C08L 61/28* (2013.01); *B32B 27/26* (2013.01); *B32B 27/42* (2013.01); *C08G 12/32* (2013.01); *C08G 73/0206* (2013.01); *C08K 5/1515* (2013.01); *C08K 5/17* (2013.01); *C08K 5/357* (2013.01); *C08K 5/42* (2013.01); *C08K 5/521* (2013.01); *C08L 71/02* (2013.01); *C08L 79/02* (2013.01); *B32B 27/10* (2013.01); *B32B 27/12* (2013.01); *B32B 2260/046* (2013.01); *Y10T 428/1303* (2015.01); *Y10T 428/1348* (2015.01); *Y10T 428/1352* (2015.01)

(58) Field of Classification Search
CPC .......... C08L 61/28; C08L 79/02; C08L 71/02; C08G 12/32; C08G 73/0206; C08K 5/521; C08K 5/42; C08K 5/357; C08K 5/17; C08K 5/1515; B32B 27/42; B32B 27/26; B32B 2260/046; B32B 27/12; B32B 27/10; Y10T 428/1303; Y10T 428/1348; Y10T 428/1352
See application file for complete search history.

(56) References Cited

U.S. PATENT DOCUMENTS

| | | | |
|---|---|---|---|
| 2006/0137566 A1 | 6/2006 | Yang et al. | |
| 2010/0087577 A1* | 4/2010 | Didavide | ............... C03C 17/009 524/262 |
| 2011/0139387 A1* | 6/2011 | Balbo Block | ........... B29C 33/62 162/158 |

FOREIGN PATENT DOCUMENTS

| | | |
|---|---|---|
| CN | 105386362 A | 3/2016 |
| EP | 2 230 258 A1 | 9/2010 |

(Continued)

OTHER PUBLICATIONS

PCT International Search Report, PCT/EP2017/060746, dated Sep. 6, 2017 (3 pages).

*Primary Examiner* — James C Yager
(74) *Attorney, Agent, or Firm* — Honigman LLP; Fernando Alberdi; Jonathan P. O'Brien

(57) ABSTRACT

The invention relates to an impregnating resin composition containing a) a melamine formaldehyde resin, b) a non-ionic wetting agent, c) a non-ionic release agent, d) a hardener, and e) polyhexamethylene guanidine (PHMG). The invention further relates to a resin coating which can be obtained by condensing the impregnating resin composition and to a resin coating containing a co-condensate made of the melamine formaldehyde resin and polyhexamethylene guanidine (PHMG). The invention further relates to an impregnate containing i) the impregnating resin composition or the resin coating and ii) an impregnate carrier material. Another object of the invention is a laminate containing iii) a laminate carrier material and iv) the impregnate or the impregnating resin composition, or the resin coating. A further object of the invention is a method for producing a laminate having the steps of i) applying the impregnating resin composition or the resin coating or the impregnate onto a carrier material and ii) compressing the component from step i). In addition, the invention concerns the use of the impregnating resin composition or the resin coating in the production of wood-based materials, impregnates, and/or laminates.

16 Claims, No Drawings

(56) References Cited

FOREIGN PATENT DOCUMENTS

| KR | 1020040038297 A | 5/2004 |
|----|-----------------|--------|
| WO | 00/18577 A1 | 4/2000 |

* cited by examiner

IMPREGNATING RESIN COMPOSITION, RESIN COATING, LAMINATE CONTAINING SAME, IMPREGNATION PRODUCT, AND METHOD FOR PRODUCING SAME

CROSS-REFERENCE TO RELATED APPLICATIONS

This application claims the benefit of and priority under 35 U.S.C. § 371 to International Patent Cooperation Treaty Application No. PCT/EP2017/060746, filed May 5, 2017, which claims the benefit of priority to German Patent Application No. 10 2016 108 549.9, filed May 9, 2016, the entire contents of both disclosures are incorporated herein by reference in their entireties.

The invention relates to an impregnating resin composition and a resin coating. Another object of the invention is an impregnate containing the impregnating resin composition and/or the resin coating. Furthermore, the invention relates to a laminate containing the impregnate and methods for its production. Furthermore, the invention relates to the use of the impregnating resin composition or of the resin coating in wood-based material, impregnate and/or laminate manufacture.

Impregnating resins are mainly used for laminate and/or impregnates in the wood and paper industry. "Impregnating resin" as used herein, is synonymous with the term "infiltration resin" similarly used by the person skilled in the art. Impregnating resins are used for impregnation, infiltration and/or coating of carrier materials such as, for example, decorative papers or wood-based materials in laminate production. Impregnating resins can be fully or partially absorbed by the carrier material and/or be present in the form of a layer on or in this. An example of the former is an impregnated overlay paper, an example of the latter is what is known as a liquid overlay.

Impregnating resins are mainly used in the production of laminates. Laminates as used, by way of example, as floor panels or in furniture production, usually have a layered structure, wherein the top layer generally consists of a layer containing an impregnating resin. Typical examples of these top laminate layers are impregnates, such as overlay or decorative papers, which are impregnated with an impregnating resin. However, the top layer can also be a specially applied impregnating resin coated layer, by way of example in the form of what is known as a liquid overlay. Overlay paper and liquid overlay layers serve to protect the surface from external influences such as wear and scratching. Because they are applied as the top layer, in addition to these mechanical properties impregnating resins must meet stringent optical requirements, particularly regarding transparency. The actual decoration of the laminate viewed by the end user is often below the impregnating resin and must be fully visible, uniform and colourfast.

The economically most important impregnating resins are amino resins and of these in particular the melamine-formaldehyde resins. Amino resins are highly versatile plastics which are used in various compositions and forms. Amino resins will be generally known to the person skilled in the art in the wood and paper processing industry, apart from in the impregnation, infiltration and/or coating of surfaces, above all also as glues, e.g. for chipboard production. Completely different amino resins are used in the production of mouldings from hard plastic, by way of example melamine cookware. Amino resins and aminoplasts are, described in "Ullmanos Enzyklöpodie der technischen Chimie" (*Ullmann's Encyclopaedia of Industrial Chemistry*), 4$^{th}$ Edition, 1974, in the chapter "Aminoplaste" (Aminoplasts) of volume 7, or in "Holzwerkstoffe und Leime" (Wood materials and glues) by Dunky and Niemz, 1$^{st}$ Edition, 2002, Volume I, Part II, Chapter 1. The term aminoplasts is generally understood to mean condensation products obtained by reacting a carbonyl compound, in practice usually formaldehyde, with a component containing amino, imino or amide groups.

The amino resins used in the wood and paper processing industry as an impregnating resin are frequently aminoplast precondensates the methylol groups of which are unetherified or partially etherified with alcohols. The most commercially important in this context are urea-melamine-formaldehyde resins and melamine-formaldehyde resins. In particular, due to the high optical and mechanical demands, the impregnating resins used for the abovementioned top layers in laminate production are primarily melamine-formaldehyde resins.

Melamine formaldehyde resins and their preparation or condensation or hardening, and modifications, are generally known to the person skilled in the art and are described in "Holzwerkstoffe und Leime" by Dunky and Niemz, 1$^{st}$ Edition, 2002, Volume I, Part II, Chapter 1. Melamine-formaldehyde resins are prepared from melamine and formaldehyde using hardeners. As an intermediate product, hydroxymethylolmelamines (hexamethylol compounds) are obtained by addition of formaldehyde to melamine in suspensions or aqueous solution. Depending on the amount of formaldehyde, tri- to hexa-hydroxymethylolmelamines form. These reaction steps are illustrated schematically in the following reaction Scheme 1:

Scheme 1

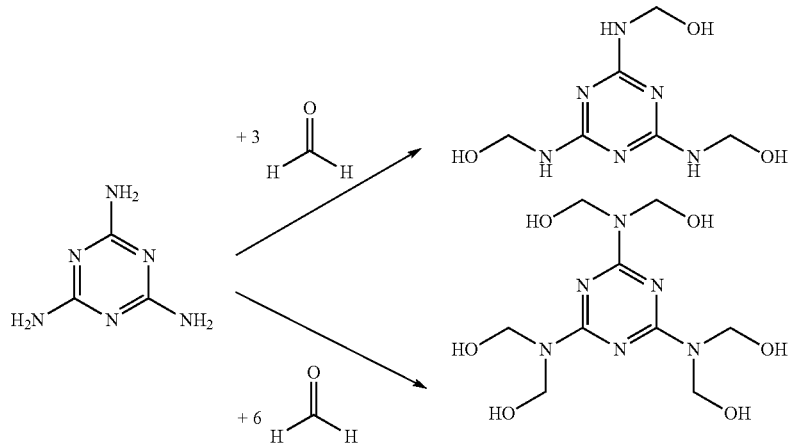

These precursors can be stored and—like more advanced condensation stages (see below) also—are referred to by the person skilled in the art as "pre-condensates".

Under pressure and/or elevated temperature starting from the precondensates another (or also already the complete) condensation or hardening of the aminoplast is carried out. Depending on the pressure and/or temperature, this can be done in stages, such that a further precondensate mixture can form, containing both the above hydroxymethylolmelamine and thus also already (partially) hardened melamine-formaldehyde resin. The condensation reactions lead to linking of the monomers via ether and methyl groups. With complete condensation or hardening a closely meshed plastic cross-linked via methyl groups forms. In Scheme 2, a cross-linked melamine-formaldehyde resin is represented, wherein the dashed lines indicate the continuation of the macromolecule.

be determined by a modified Martindale test—a standard test method for determining the micro-scratch resistance of laminate flooring (DIN EN ISO 12947:04/1999 or IHD W-445, Version of May 2007). In order to increase the surface resistance of laminate and/or wood-based materials, it is known to further coat the decorative and/or overlay papers or the surface of the wood-based material with its own specially coated layer, for example in the form of what is known as a transparent liquid overlay or overlay film.

Further requirements for the top layer of the laminate, which usually contains or consists of impregnating resin, are the optical properties such as high transparency, light and colour fastness, optical quality, and desired optical effects such as glossiness or dullness of the surface, already described above.

Scheme 2

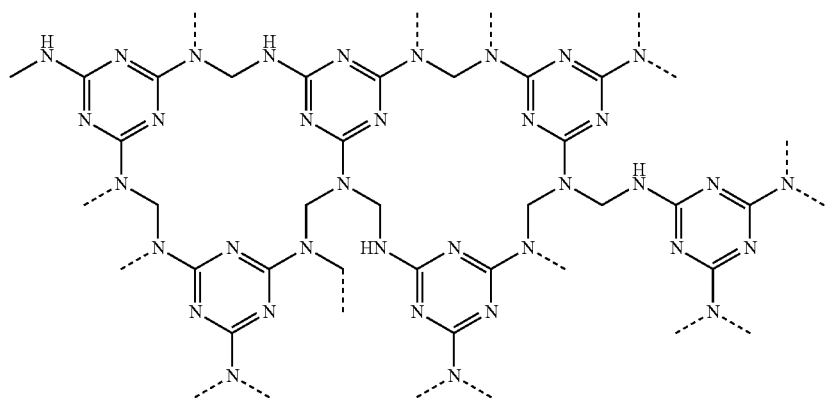

Amino resins are generally prepared in aqueous medium.

Laminates, whether used in the flooring or furniture sectors, and the impregnating resins used in their production are subject to stringent requirements. These are, by way of example, set out in DIN EN 13329. Laminates must therefore not only have good properties with regard to their further processing, but must have excellent resistance to scratching and abrasion of their surface due to the intense stresses on them, particularly when used for flooring. This is specified, by way of example, in DIN EN 13329, and may Simultaneously meeting these mechanical (e.g. hardness, abrasion resistance, scratch resistance and/or wear resistance) and optical requirements is a major challenge when selecting the impregnating resin. In practice, these are best met by an impregnating resin composition based on melamine-formaldehyde resin, which contain as further components, wetting agents, release agents, and hardeners.

The object of the present invention is to further improve this type of high quality impregnating resin composition containing melamine-formaldehyde resin, wetting agents, release agents, and hardeners. Such impregnating resin compositions are hereinafter also referred to as "generic impregnating resin compositions".

Generic impregnating resin compositions, such as are used primarily in laminate or impregnate production, consequently differ significantly in their chemical composition and their properties and requirements from other amino resins, as used, inter alia, in glues, paints or hard plastic polymer blends, for example melamine plastic for cookware.

Generic impregnating resin compositions, as used herein, always have as mandatory constituents melamine-formaldehyde resin, wetting agents, release agents, and hardeners. As a result, the generic impregnating resin compositions differ from a purely chemical point of view from melamine resin plastics and also from aminoplast-based glues which do not contain a combination of wetting agents, release agents, and hardeners. Nor do typical melamine resin-based glues or melamine resin plastic materials have the mechanical and optical properties required for the impregnating resin used in laminate or impregnate production.

In the prior art, with generic impregnating resin compositions to date the focus has been on optimising the optical and mechanical surface properties. A surface property that up until now has not played a major role in impregnating resins, and for which the prior art provides no satisfactory solution, concerns the antimicrobial properties.

Basically, however, there is a high demand for surfaces with antimicrobial properties. This applies both to laminates which are used in the flooring and/or furniture sectors and those used in sectors subject to the greater hygiene requirements. For heavily-used surfaces with more stringent hygiene requirements, e.g. in medical and public areas, but also laboratories, kitchens and sanitary and living areas, antimicrobial surfaces are desirable with regard to the health and quality of life of users and can help avoid contamination and infections. This also applies to surfaces exposed to particular levels of moisture, e.g. in roofing, basement or wall areas.

Against this background, it is desirable to provide improved impregnating resin compositions and impregnating resin layers, impregnates and laminates made therefrom, the surfaces of which have an increased resistance to microorganisms, without thereby impairing the excellent optical and mechanical properties that would already be achievable in the prior art.

To avoid, or reduce microbial contamination, in the prior art attempts have essentially already been made at using various substances with an antimicrobial, biocidal or fungicidal effect in laminate production. Chemicals that prevent contamination by wood-destroying or -discolouring fungi or insects preservative treatment of wood) or, in the case of a contamination that has already occurred, kill harmful organism (curative treatment of wood), as a rule always contain biocides as active constituents. Biocides are classified in the Biocides Regulation (EU) No 528/2012.

Thus, in the prior art individual biocides and additives for antimicrobial finishing of amino resins are generally known. However, for the antimicrobial finishing in particular of generic impregnating resin compositions, which in addition to melamine-formaldehyde resin contain at least wetting agents, release agents and hardeners, and which satisfactorily achieve the above-mentioned mechanical and optical properties, the prior art provides no solutions or references.

JP 08073702 A describes, by way of example, antibacterial melamine resins, containing a mixture of aluminium, magnesium and silicon oxides and elemental silver and zinc as an antibacterial agent. In this way, antibacterial properties were achievable for up to 48 hours. The disadvantage of this solution is the only short-duration antibacterial property and the large number of individual antibacterial components necessary. The more individual components that are added to a melamine resin, the more difficult it is to optimally coordinate the quantities of all components of the resin liquor and without impairing the desired mechanical and optical properties.

WO 03/009827 A1 describes melamine resins containing a mixture of a diphenyl ether derivative and orthophenyl phenol as antimicrobial components. A disadvantage of these additives is that they are easily washed out of the resin surface, so that the antibacterial effect decreases with time and chemicals are released into the environment.

U.S. Pat. No. 6,248,342 B1 describes antibacterial laminates, in the melamine resin-impregnated surface of which an inorganic, metal ion-containing antibacterial component has been incorporated. As the antibacterial components zeolites are preferably used containing metal ions such as, by way of example, Ag, Cu, Zn, Hg, Sn, Pb, Bi, Cd, Cr, or mixtures thereof. Through ion exchange processes, the metal ions reach the laminate surface and thus allow the antibacterial effect. This has the disadvantage that the metal ions may be converted into oxides, hydroxides or other salts and then settle in this form on the laminate surface, where they weaken the antibacterial effect. From a health perspective, the use of the aforementioned heavy metals is also questionable.

Due to the disadvantages described above, many antimicrobial additives or wood preservatives containing biocidal substances cannot be optimally used in interior design. Furthermore, the biocides can affect the health of people and their environment because of their potential emissions through evaporation, abrasion or by other release. But often biocides may also lose their effect by gradual (natural) degradation. Water-soluble or water-based biocide-containing wood preservatives, by way of example, may be washed out over time whereby, on the one hand, the antimicrobial property of the surface is weakened and, on the other, an increased environmental impact can occur.

A further disadvantage of the hitherto proposed biocides is that these are very harmful to health on the one hand and on the other are poorly absorbed into the resins used in fibreboard production and/or are incompatible with them.

The present invention is preceded by extensive research activity in which numerous candidate substances were tested as antimicrobial additives in generic impregnating resin compositions. Here, the inventors were faced with serious problems. Many additives lost their antimicrobial properties after hardening of the impregnating resin. This could be explained firstly by loss of antimicrobial structural units by abreaction during the condensation reaction of the resin. However, other additives proved simply to be insufficiently temperature-resistant to withstand the high compression and drying temperatures occurring during the impregnate and laminate production. Some additives were incompatible with the usual components of the generic impregnating resins or disrupted the condensation reaction, resulting in a deterioration of the mechanical and/or optical properties of the impregnating resin. In the majority of the additives tested, anchoring in the melamine-formaldehyde matrix did not take place, such that the additives were washed out in the finished products by means of aqueous liquids or by the organic solvents present in common cleaning agents, which was accompanied by a decrease in antimicrobial surface properties over time.

Furthermore, it is important for the sustainable use of raw materials, to find an antimicrobial agent that does not adversely affect the quality of recyclable materials. The impregnating resin containing coatings usually present with a transparent design are also often subject to direct sunlight. Therefore, an appropriate antimicrobial agent must have sufficient UV stability and should not load to any colour impairment.

Finally, in the processing of generic impregnating resin compositions customary on the market, depending on the product requirement, a variety of other additives are used. The antimicrobial agent must likewise be fully compatible with these to avoid a deterioration in the impregnating resin properties.

To address the problem of washability other additives that were polymerized into the melamine-formaldehyde matrix were also tested. However, this meant they lost many of their antimicrobial properties and/or impaired the network structure of the melamine-formaldehyde matrix, which was accompanied by a deterioration of the mechanical and/or optical properties of the impregnating resin.

In this context, antimicrobial substances were tested with functional groups which are capable of polymerizing into the melamine-formaldehyde matrix of generic impregnating resin compositions. However, such mixed condensation products raised quite considerable concerns. Thus, such an antimicrobial functionalisation of a decorative melamine resin coating places stringent demands upon the antimicrobial agent, to be used. It is particularly important here to withstand the extreme processing temperatures of the drying and compression units and also to not adversely alter the desired and finely-balanced mechanical and optical properties of the impregnating resin. Furthermore, the antimicrobial agent must be miscible with the impregnating resin, that is to say preferably be water-soluble, be condensable in the precondensate and not interfere with the initial and final crosslinking of the melamine-formaldehyde matrix.

In the past, experiences with mixed condensation products, by way of example, co-condensates of melamine-formaldehyde impregnating resins with urea, were poor. Even a copolymerisation with urea leads to an undesirable clouding and deterioration of the mechanical properties of the impregnating resin. This is remarkable insofar as urea and melamine are structurally related and these two substances could have been expected to be compatible. Nevertheless, these urea-melamine-formaldehyde mixed condensates were not up to the high demands that are placed on impregnating resins.

The copolymerization with urea seems to lead to a less homogeneous resin which, when hardened, is softer than pure melamine-formaldehyde resins. These mixed condensation products did not exhibit the desired transparency either. Without wishing to be bound to a scientific theory, the clouding appears to be explained by the fact that as a result of the copolymerisation of urea, "defects" seem to appear in the otherwise uniform melamine formaldehyde matrix, which preclude a homogeneous condensation and hardening or crosslinking of the resin. Where these "defects" occur, the resin is probably no longer able to optimally crosslink and thus harden uniformly. All in all, it should be noted that the urea-melamine-formaldehyde resins lack the necessary combination of mechanical strength, i.e. abrasion resistance and scratch resistance, and a highly-transparent and optically-appealing appearance. For this reason, pure melamine-formaldehyde resins are still used today in, by way of example, laminate production, at least for the top layer, which must meet the most stringent requirements.

Against this background, there were already concerns about copolymerisable antimicrobial additives which have then been confirmed in practical tests. Similar to the copolymerisation with urea it was not possible with the tested copolymerisable antimicrobial substances to create antimicrobial surfaces without leading to a loss in transparency and mechanical properties.

So when searching for an antimicrobial impregnating resin the dilemma was that the antimicrobial opens on the one hand must remain active for a long time and should have sufficient fixation in the surface, but in doing so it should not lose its antimicrobial properties and must not interfere with the mechanical and optical properties of generic impregnating resin compositions. Therefore, covalent bonding within the formaldehyde-melamine resin matrix, due to the problems discussed above, is both desirable and problematic, particularly in view of the preservation of the mechanical and optical properties of the impregnating resin.

In summary it can be stated that generic impregnating resin compositions have a diverse profile of requirements with to some extent antagonistic properties, which represents a real challenge in the search for a suitable antimicrobial agent for use in these impregnating resin compositions. A convincing solution for an antimicrobial impregnating resin composition that could also have established itself in practice in the production of laminates has, thus far at least, not yet been proposed.

Starting from the prior art described above and its drawbacks, an object of the invention was to provide an impregnating resin composition having increased resistance to microorganisms, without using a substance that is unstable, can be washed out or is fraught with risk, and without causing a deterioration of the mechanical and optical properties of the surfaces obtained from the impregnating resin composition. Another aspect of the object of the invention was to provide products that are eco-friendly and not harmful to health, the surfaces of which are characterised by a long-lasting resistance to microorganisms.

A further object of the invention was to demonstrate an impregnating resin composition, by which sufficient protection against micro-organisms at little effort, in particular with low introduction of foreign matter in the impregnating resin composition and/or the surfaces obtained therefrom, and little to no increase in manufacturing costs is achieved. At the some time it should be ensured that the stringent demands on generic impregnating resin compositions in terms of mechanical resistance and optical properties of the surfaces obtainable therefrom are still met.

According to the invention, this object is achieved by the impregnating resin composition according to Claim 1, the resin coating according to Claim 4, the impregnate according to Claim 6, the laminate according to Claim 9, the method according to Claim 12 and the use according to Claim 14. Particular embodiments of the invention are given in the dependent claims.

The impregnating resin composition according to the invention contains a melamine-formaldehyde resin;
b) a non-ionic wetting agent;
c) a non-ionic release agent;
d) a hardener; and
e) polyhexaraethylene guanidine (PHMG).

The words "a" or "an" used here or elsewhere, shall be understood in the sense of "at least one".

Surprisingly, it has been found that the impregnating resin composition according to the invention overcomes the problems known from the prior art. Surfaces obtainable from the impregnating resin composition according to the invention have a long-lasting antimicrobial effect and at the same time meet the strict requirements of the mechanical strength and the transparency and optical appearance, even though the impregnating resin composition additionally contains polyhexamethylene guanidine (PHMG).

Polyhexamethylene guanidine (PHMG) is a polymeric guanidine compound.

As explained before, prior to the invention, in tests a wide variety of impregnating resin compositions were prepared, and tested for mechanical, optical, and also antimicrobial properties. Here, antimicrobial substances including molybdenum compounds, silver ions and zinc oxide, were introduced into pure melamine-formaldehyde resin with the usual additives, such as hardeners and non-ionic wetting and release agents. Nevertheless, these additives did not show satisfactory results. Due to the formation of insoluble compounds, the above-mentioned metal ions such as zinc, silver and molybdenum, experienced irreversible inhibition of the antimicrobial effect. In order to produce their antimicrobial effect or to allow their processing, other active substances require the presence of sufficient amounts of water, which is not present under normal operating conditions. Thus, an effect of these biocides was demonstrated solely under test conditions such as are present, by way of example, using the Japanese standard test JIS Z 2801.

Even mixing only polymeric guanidine compounds such as polyhexamethylene guanidine (PHMG), with an impregnating resin composition containing, as the impregnating resin, melamine-formaldehyde resin, and the usual hardeners and non-ionic wetting and release agents, did not lead to the desired results. These impregnating resin compositions showed little to no antimicrobial activity after hardening. Furthermore, the stringent requirements for mechanical resistance and optical appearance were not met.

Surprisingly, it was found that only the inventive impregnating resin composition, which provides a combination of polyhexamethylene guanidine (PHMG) with non-ionic wetting agents and release agents, had the aimed-for antimicrobial activity over a long period, and at the same time the necessary mechanical and optical properties were not adversely affected. Thus, only the particular combination of components a) to e) of the impregnating resin composition according to the invention made the excellent effect possible. Tests have shown that even low deviations from the impregnating resin composition according to the invention resulted in the good antimicrobial properties being lost in full or in part and/or to the mechanical and optical properties being adversely affected.

It was surprising here that through the use of polyhexamethylere guanidine (PHMG) in combination with the use of non-ionic rather than ionic vetting and release agents, the problems listed above, known from the prior art, can be largely avoided or reduced.

The use of polyhexamethylene guanidine (PHMG) in the area of generic impregnating resin compositions having the stringent mechanical and optical requirements described above has not been known to date. Only in the field of melamine-hard plastic applications, which are completely different from impregnating resins, and for phenol resins, which are distantly related to melamine-formaldehyde resins, the addition, but not the copolymerisation, of solid, polymeric guanidine compound-containing powders, has occasionally been proposed.

Thus WO 2010/106002 A1, described a microbiocidally-acting powdery polymer blend comprising a first polymer as a matrix in which a second polymer is incorporated, wherein the second polymer is a polymeric guanidine or biguanidine derivate. WO 2010/106002 A1 suggests as the first polymer a variety of polymers, primarily thermoplastics, which in the examples melted as finished plastics and blended with the polymeric guanidine compound in extruders. Only in the paragraph spanning pages 3 and 4 are phenol resins and aminoplasts, such as melamine resins and urea resins, mentioned as possible matrix polymers. However, only the incorporation of the polymer guanidine into a phenol resin precondensate ("Novolak") is specifically described. The person skilled in the art will appreciate that this does constitute a copolymerisation of the polymeric guanidine compound in the phenolic resin matrix.

The person skilled in the art will, by way of example, know from mixtures of phenoplast and melamine, that with phenoplasts copolymerisation of amino group-containing components, as contained in the melamine or also in the polymeric guanidine, does not take place. It can therefore be assumed that in the embodiment described in WO 2010/106002 A1, phenoplast and polymeric guanidine exist, alongside each other in a simple mixture, but not as co-condensate. As an application WO 2010/106002 A1 suggests admixing this powder with, by way of example, dispersion colours or using it as a filler (referred to as an aggreqate) in the paper industry. An application as an impregnating resin or in wood-based material, laminate or impregnate production is not proposed.

WO 2010/106002 A1 refers explicitly to the fact that ingredients present in coating materials, points and lacquers can lead to anything from a weakening to inactivation of the antimicrobial activity of the polymeric guanidines, so the mixture of the polymeric guanidine with the matrix polymer, such as, by way of example, a thermoplast or phenoplast, and its use as a powder, is an important prerequisite for further processing, the field of application and preserving the antimicrobial properties. While the document demonstrates a possibility for reducing the incompatibility of the polymeric guanidine compounds with coating materials, paints and lacquers, nevertheless such a polymer powder is totally unsuitable for incorporation into a generic impregnating resin, which is to meet the stringent requirements set out above.

Following the furnishing of such a polymer powder, impairment of mechanical properties and particularly an unacceptable clouding of the impregnating resin can be expected. In addition, the incorporation of such a polymer powder also results in a disturbance of the condensation or hardening of the impregnating resin, so that a much "softer" and therefore insufficiently resistant coating would be obtained.

Against the background of WO 2010/106002 A1 and common general knowledge in polymeric guanidine compounds, it was surprising that in the impregnating resin composition according to the invention polyhexamethylene guanidine (PHMG) even without the matrix polymer required according to WO 2010/106002 A1 gives excellent results when it is combined with non-ionic wetting agents and release agents.

Polymeric guanidine compounds, particularly polyhexamethylene guanidine (PHMG), have so far mainly appeared as disinfectant auxiliary components for disinfection of skin or mucous membranes, in wound antisepsis, in hand disinfectants, in purely surface disinfection, for example by applying and wiping off a guanidine-containing solution, in the medical field for the control of bacteria or to disinfect water, for example in swimming pools.

In the disinfectant list of the VAH (mhp Verlag 2015), which contains all preparations certified by the Disinfectants Commission, the following is stated regarding guanidine derivatives "Due to their narrow spectrum of activity [ . . . ] and their favourable low human toxicoicgical properties, guanidines are preferably used in mucous membrane and wound antisepsis. Due to their remanence effect, they are used as additional components in skin antiseptics and hand disinfectants, or they are used in combination with other active substances."

Against this background and the problems described above, it was not obvious to the person skilled in the art that polyhexamethylene guanidine (PHMG) can be easily incorporated into an impregnating resin composition without disturbing the mechanical properties and crosslinking capability whilst simultaneously having a sufficient antimicrobial effect on microorganisms. This is particularly true for microorganisms that typically contaminate cellulosic or wood-containing products (laminates or impregnates in floor coverings, surfaces or furniture). The spectrum of microorganisms to be controlled in skin or water disinfection is fundamentally different from those typically contaminating cellulosic or wood-containing products. In human applications and medical surface disinfection, it is bacteria that are at the forefront. The microorganisms that contaminate wood or cellulosic or wood-containing products (laminates or impregnates in floor coverings, surfaces or furniture) typically involve fungi.

Moreover, it was not foreseeable by the person skilled in the art that polyhexamethylene guanidine (PHMG) would be compatible with the process conditions applicable during the production and application of impregnating resin compositions, during laminate- and/or impregnate production and with the chemicals used therein. The latter issue has already been discussed above. In practical tests, the polyhexamethylene guanidine (PHMG) used according to the invention surprisingly demonstrated a sufficient temperature resistance in relation to the storage conditions, drying and or compression temperatures occurring during the preparation and use of impregnating resin compositions in laminate and/or impregnate production.

Use of polyhexaraethylene guanidine (PHMG) according to the invention also has the advantage that it has a very low toxicity and has been shown in practical tests also not to develop any resistance to microorganisms. Furthermore, an environmentally friendly and/or harmless product can be obtained by the use of polyhexamethylene guanidine (PHMG) since this does not contain a heavy metal, or a biocide according to the Biocides Regulation.

Surprisingly, it has also been found that the antimicrobial effect of polyhexaraethylene guanidine (PHMG) is probably based on a purely physical mode of action of cationic surfaces. However, such physical modes of action do not fall under the Biocides Regulation (EU) No 528/2012. Article 3, paragraph 1 a) or the latter defines biocidax products as "any substance or mixture, in the form in which it is supplied to the user, consisting of, containing or generating one or more active substances, with the intention of destroying, deterring, rendering harmless, preventing the action of, or otherwise exerting a controlling effect on, any harmful organism by any means other than mere physical or mechanical action".

Another advantage of the impregnating resin composition according to the invention is that it can be manufactured in a simple and cost effective manner. Furthermore, it exhibits a good storage stability. This also applies to the processed products obtainable from the impregnating resin composition according to the invention.

The term "processed products", as used herein, shall mean in particular the melamine-formaldehyde resin layer according to the invention, and the laminate and/or impregnate according to the invention, as described below, containing the impregnating resin composition according to the invention in partially or fully condensed-out form, or produced using these. These processing products preferably contain the following components:

g) a co-condensate of melamine-formaldehyde resin and a polymeric guanidine compound;
b) a non-ionic wetting agent;
c) a non-ionic release agent; and
d) a hardener.

If here or elsewhere, instead of "condensation", "condensed" or "condensate" is mentioned, then this shall mean condensation, as commonly used in the field of chemistry. In chemistry, a condensation reaction is understood to be a reaction in which at least two molecules form a covalent bond with one another with the elimination of water—or alternatively ammonia, carbon dioxide, hydrogen chloride, an alkanol, or other low molecular weight substance. "Condensation" in connection with resins will also be referred to by the person skilled in the art working in the wood or paper processing industry as "hardening". Condensation or hardening can be carried out stepwise or partially. Condensation or hardening of the amino resin is typically carried cut under the influence of a hardener, elevated temperature and/or pressure. Examples include drying processes and/or compression to form a laminate. Through the presence and/or release of a hardener a further condensing or hardening of the resin can also take place during storage or in the subsequent application or production of the final product.

The storage stability is crucial in impregnate production in particular. Typically impregnates are produced separately, rolled up, and stored for up to two months before they are processed. Practical tests have shown, that even after prolonged storage, the targeted antimicrobial, mechanical and optical properties of the impregnating resin composition according to the invention are maintained and the applied impregnating resin composition continues to demonstrate good adhesive properties during further processing.

The impregnating resin composition is usually fluid, and is thus present as a liquid. It may contain solid particles in the form, by way of example, of a suspension. It is preferably used as a water-based impregnating resin composition. The impregnating resin composition nay be used as a solution or suspension. It is preferably used as an aqueous solution. In this form, the impregnating resin composition can easily be integrated into and processed in the usual processes and conditions of impregnate- and/or laminate production without major adaptations. According to an embodiment, the components a) to e) in the impregnating resin composition according to the invention are present in aqueous solution. This means that the impregnating resin composition according to the invention in addition to these components a) to e) may also contain further non-soluble components.

In further tests of the impregnating resin composition and its processed products, these demonstrated their good UV resistance. This was an indication of the good stability of the impregnating resin composition and its processed products. The impregnating resin composition of the invention and the processed products of therefrom also demonstrate a sustained antimicrobial effect.

Antimicrobial as used herein, means that the total number of microorganisms on the surface in question is constant or decreasing over a certain period. Antimicrobial is also understood in particular to mean bactericidal, bacteriostatic, fungicidal and/or fungistatic. "Microorganisms" are typically microscopically small living beings (organisms) that are undetectable with the naked eye. In the system of living things they do not constitute a single group. Microorganisms include bacteria, fungi, microscopic algae and protozoa (e.g. paramecia and the malaria parasite Plasmodium) and viruses.

If here or elsewhere "bacteria" are mentioned, then this shall mean the entire realm of "bacteria". These include, for example, *Staphylococcus, Escherichia coli, Pseudomonas agruginosa, Acinetobacter, Enterococci*, other causes of nosocomial infections and/or wood-destroying bacteria.

If here or elsewhere "fungus" or "fungal infection" is mentioned, then "fungus" shall mean the broad definition of the realm of "fungi" from the biological taxonomy. This includes not only single-celled organisms such as baker's yeast but also multicellular organisms such as mildews or basidiomycetes. Here, the term "fungus" primarily means wood-destroying and/or—discolouring fungi or contamination by these. Such wood-destroying and/or wood-discolouring fungi typically damage wood, by way of example, through brown rot, white rot, soft rot, mould, blue or red tinge. According to an embodiment, the fungi concerned are mildew and/or blue stain fungi. The fungi can further be selected from the basomycetes, ascomycetes and deutomycetes.

The phrase "increasing the resistance to microorganisms" as used herein, shall mean a reduction in the contamination by microorganisms as compared to a reference with a non-antimicrobial effect. This resistance by surfaces to microbial contamination can be determined, by way of example, according to standard EN ISO 846:1997 "Evaluation of the action of microorganisms on plastics". In the experiments the antimicrobial activity was tested by means of the test organisms *S. aureus* and *E. coli* and germ reductions of 5 log levels were achieved within 3 hours.

Surprisingly, despite the good water solubility of the antimicrobial polyhexamethylene guanidines no problems of wash-out and associated loss of effect were experienced. The polyhexamethylene guanidine (PHMG) therefore appears to be adequately fixed in the impregnating resin composition or in the subsequently processed products. Without wishing to be bound by any particular scientific theory, this fixation is therefore likely to stem from the fact that polyhexamethylene guanidine (PHMG) condenses in the melamine-formaldehyde resin, whereby a co-condensate is obtained of melamine-formaldehyde resin and polyhexamethylene guanidine (PHMG).

Since the wholly or partially hardened or condensed impregnating resin composition in the processed products has the desired mechanical and optical properties, it can be assumed that this co-condensate is able to continue cross-linking easily without generating defects. Thus, a covalent integration of polyhexamethylene guanidine (RHMG) into the melamine-formaldehyde resin occurs.

Such a co-condensate of melamine-formaldehyde resin and polynezamethylene hydrochloride (PHMG*HCl) is shown in simplified form in Scheme 3. The dashed lines or the square brackets which are provided with the suffix "n" indicate the continuation of the macromolecule.

Scheme 3

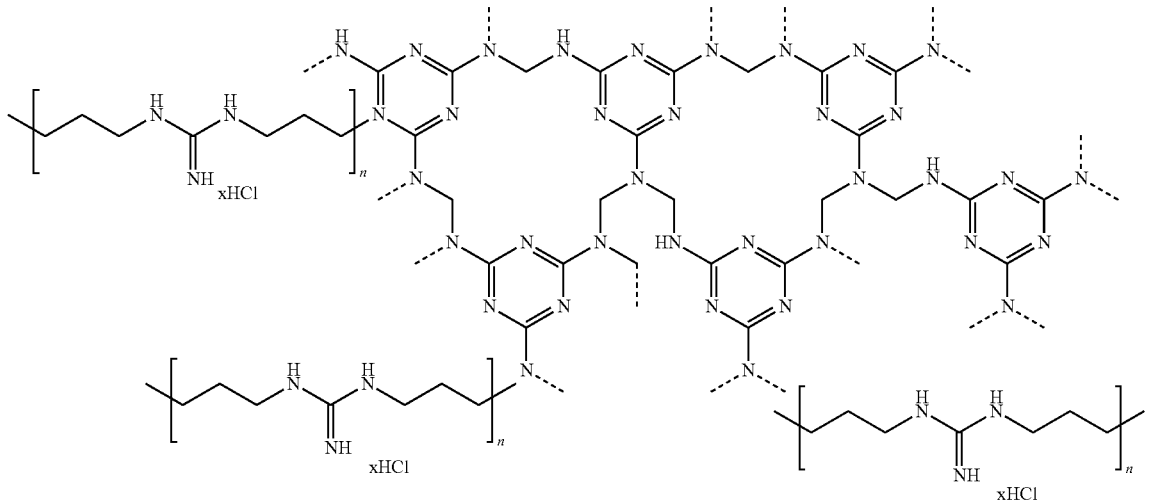

The excellent mechanical and optical properties of the impregnating resin composition according to the invention and the processed products obtained therefrom were surprising, since—as explained above—a copolymerisation, by way of example even with the structurally-related urea, in the past led to inhomogeneous resins which did not meet the stringent requirements of impregnating resins. It was therefore all the more surprising that polyhexamethylene guanidine (PHMG), which also has a partal urea structure, did not generate any "defects", which hinder the homogeneous condensation and hardening or crosslinking of the resin. The person skilled in the art would have conversely expected a deterioration of the properties of the impregnating resin and the impregnating resin composition. Against the background of the poor experiences described above even with melamine-formaldehyde-urea co-condensates, the good mechanical and optical properties of co-condensates obtainable according to the invention from melamine-formaldehyde resin and pelyhexamethylene guanidine (PHMG) were surprising.

If here or elsewhere "impregnating resin composition" is mentioned, then this shall mean a mixture of an impregnating resin (component a)) and at least one of the components b) to e). Thus, the impregnating resin composition is distinct from impregnating resin. The impregnating resin used in the impregnating resin composition according to the invention is a melamine-formaldehyde resin. Melamine-formaldehyde resins and their preparation or condensation or hardening and modifications are generally known to the person skilled in the art and have already been described above.

"Impregnating resin" as used herein, synonymous with the term "infiltration resin" similarly used by the person skilled in the art. "Impregnating resin composition", as used herein, is synonymons with the term "impregnating resin liquor", "impregnating resin composition" or "infiltration resin—liquor".

As component a) the impregnating resin composition of the invention contains a melamine-formaldehyde resin. If here or elsewhere impregnating resin is mentioned, then this shall mean the melamine-formaldehyde resin. For the melamine-formaldehyde resin used according to the invention, that already stated in the introduction concerning melamine-formaldehyde resins known from the prior art applies.

Preferably, the melamine-formaldehyde resin is a condensate with a molar ratio of formaldehyde to melamine of 1:1.2 to 1:1.7. Preferably, the melamine-formaldehyde resin that can be used according to the invention also has a pH in the range of 8 to 11, preferably from 9 to 11 and particularly preferably from 9.3 to 10. Advantageously, the melamine-formaldehyde resin that can be used according to the invention has a density at 20° C. in the range 1.1 to 1.5 g/ml, preferably from 1.15 to 1.45 g/ml and particularly preferably of 1.2 to 1.4 g/ml as measured using the hydrometer method. It is also advantageous if the melamine-formaldehyde resin that can be used according to the invention has a dynamic viscosity at 20° C. of 50 to 150 mPa·s, preferably 70 to 130 mPa·s, measured by rotational viscometry using cone/plate geometry.

The cloud point of the melamine-formaldehyde resin that can be used according to the invention is preferably in the range of 35 to 65° C., preferably 35 to 50° C., particularly 40 to 45° C. To measure the cloud point, a sample from the reaction process is diluted with water until the content of the melamine-formaldehyde condensate that, formed during the reaction and optionally also still contains existing monomeric melamine and formaldehyde, is 6.75 wt. %, in relation to the total weight of the impregnating resin composition. The amount of melamine-formaldehyde condensate, melamine and formaldehyde can be calculated from the amount of the feedstocks, wherein the melamine and formaldehyde bound in the melamine-formaldehyde condensate is also counted as monomeric melamine and formaldehyde. This calculated content is consistent with the value determined according to the method described in DIN 12605 for the solid content if approximately a further 2% is added. The sample solution prepared in this way is heated until a clear solution forms and then cooled at a rate of approximately 10° C. per minute. The cloud point is the temperature at which turbidity occurs, visible with the naked eye by looking through a sample vessel with a layer thickness of 1 cm.

The solid content of the melamine-formaldehyde resin is preferably from 50 to 70 wt.-%, more preferably 53 to 65 wt.-% and particularly preferably 60 to 63 wt.-%, in relation to the total weight of the melamine-formaldehyde resin.

According to an embodiment, the melamine-formaldehyde is the only impregnating resin which is contained in the impregnating resin composition according to the invention.

According to a preferred embodiment, the impregnating resin composition contains the melamine-formaldehyde resin in an amount of 25 to 60 wt.-%, in relation to the total weight of the impregnating resin composition.

As component b) the impregnating resin composition according to the invention contains a non-ionic wetting agent. It has surprisingly been found that by the use of a non-ionic wetting agent, the problems known from the prior art as set out above can be largely avoided or reduced, but the stringent requirements placed on impregnating resins can still be met. The non-ionic wetting agents used according to the invention have good compatibility with the impregnating resin composition and the polyhezamethylene guanidine (PHMG) contained therein.

Practical tests have shown that using the ionic wetting agents usually used in impregnating resin compositions, does not lead to the success according to the invention. Processed products, produced from impregnating resin compositions, containing polymeric guanidine compounds such as polyhexamethylene guanidine (PHMG), and ionic wetting agents, exhibited good mechanical and optical properties, but—despite the presence of the polymeric guanidine compound such as, for example, polyhexamethylene guanidine (PHMG)—either no or insufficient antimicrobial effect could be observed.

Wetting agents are known to the person skilled in the art and are—in ionic form—common ingredients of generic impregnating resin compositions. The person skilled in the art will understand wetting agents to be surface-active substances that improve the wettability of solids by liquids. Wetting agents reduce the surface tension of liquids and the surface tension between liquids and solids. Wetting agents essentially comprise a non-polar (hydrophobic) and polar (hydrophilic) part. An alkyl group can, by way of example, serve as a non-polar part. The polar part may be constructed differently and determines the classification of the wetting agent among non-ionic, anionic, cationic and amphoteric wetting agents. Non-ionic wetting agents can have as a nonpolar group an alkyl radical ($C_{12}$-$C_{18}$) and as a polar group a hydroxyl group and/or an ether group. Anionic wetting agents have at least one negatively charged functional group. The polar group may have either a negatively charged functional group, in particular —$COO^-$ (carboxylate), —$SO_3^-$ (sulfonate), or —$SO_4^2$ (sulphate). Cationic wetting agents may have as a polar group, by way of example, a quaternary ammonium group ($R_4N^+$).

Wetting agents typically have an HLB value of approximately 6.5 to approximately 9.5. Here, HLB stands for "hydrophilic-lipophilic balance", a technical term familiar to the person skilled in the art (see for example "Pharmazeutische Technologie" [Pharmaceutical Technonolgy], Voigt, Deutscher Apotheker Verlag Stuttgart, 2000, p. 348 ff). Preferably, the non-ionic wetting agent has an HLB according to Griffin of 10 to 18.

The wetting agent that can be used according to the invention is a non-ionic wetting agent. Preferred non-ionic wetting agents are selected from the group consisting of polyalkylene glycol ethers, alkyl polylucosides, and nonylphenol ethoxylates and fatty alcohol ethoxylates, and mixtures thereof. Particularly preferred are polyalkylene glycol ethers and particularly preferably fatty alcohol ethxylates (FAEO).

In a preferred embodiment, the impregnating resin composition contains a non-ionic wetting agent in an amount of 0.1 to 3 wt.-%, preferably from 0.2 to 1.0 wt.-% and particularly preferably from 0.2 to 0.4 wt.-%, with regard to the solid resin content of the melamine-formaldehyde resin.

As component c), the impregnating resin composition according to the invention contains a non-ionic release agent. Surprisingly, it was found that by using a non-ionic release agent the problems listed above, known from the prior art can be largely avoided or reduced, but the stringent requirements on impregnating resins can still be met. The non-ionic release agents that can be used according to the invention exhibit a and compatibility with the impregnating resin composition and the polyhexamethyleve guanidine (PHMG) contained therein.

Release agent are generally understood to be solid or liquid substances which lower the forces of adhesion between two adjacent surfaces (by way of example, moulding/mould), that is to say prevent them sticking by forming an easily separable film between the two surfaces (adhesive agent). The general properties of release agents are chemical indifference, good spreadability, a melting point adapted to the processing operation, low volatility and for liquids low solubility in the substance to be separated. Release agents are applied, by way of example, in the form of dispersions (emulsions or suspensions), sprays, pastes or powders. A special case is constituted by what are known as internal release agents, which are mixed into the product being demoulded and are able to accumulate on the surface of the product being demoulded or bring about faster hardening of the surface of the product being demoulded. Typical release agents are silicones (in the form of oils, oil emulsions in water, fats and resins), waxes (essentially natural and synthetic paraffins with and without functional groups), metal soaps (metallic salts of fatty acids such as calcium, lead, magnesium, aluminium or zinc stearate), fats, polymers (polyvinyl alcohol, polyester and polyolefins), fluorocarbons, and inorganic release agents in the form of powders (such as graphite, talc, and mica). Release agents can have different structures and can therefore be divided into anionic, cationic and non-ionic release agents.

In generic impregnating resin compositions, the person skilled in the art will customarily use primarily ionic release agents. These include fatty acid alkyl sulfonates and fatty acid alkyl phosphates. These ionic release agents have the advantage that they are readily accessible synthetically and thus economically advantageous.

Practical tests have shown that employing the ionic release agents customarily used in impregnating resin compositions, does not lead to the success according to the invention.

Processed products, prepared from impregnating resin compositions, containing polymeric guanidine compounds such as, for example, polyhexamethylene guanidine (PHMG), and ionic release agents, exhibited good mechanical and optical properties, but—despite the presence of the polymeric guanidine compound such as, for example, polyhexamethylene guanidine (PHMG)—either no or insufficient antimicrobial effect could be observed.

Preferred non-ionic release agents are selected from the group consisting of fatty acid glyceride, ethexylated fatty alcohols and higher fatty acid phosphate esters, and mixtures thereof. Particularly preferred are fatty acid glycerides and particularly preferred are ethoxylated fatty alcohols.

In a preferred embodiment, the impregnating resin composition contains the non-ionics release agent in an amount of 0.1 to 1.0 wt.-%, preferably from 0.2 to 0.5 wt.-% and particularly preferably from 0.2 to 0.4 wt.-%, with regard to the solid resin content of the melamine-formaldehyde resin.

As component d), the impregnating resin competition according to the invention contains a hardener. Hardeners are used the impregnating resins for the promotion of condensation or hardening Hardeners which are used in generic impregnating resin compositions typically release at least one free acid in the presence of water and/or heat. Particularly preferably, the hardener to be used according to the invention releases an acid in the presence of water and/or under the effect of heat. In this way it is possible to specifically control the conditions under which the hardener release the acid. This allows good control over the process. Typically, a Brönsted acid is released. Brönsted acids are generally known to the person skilled is the art. Examples and properties of Brönsted acids are described, by way of example, in "Basiswissen der Chemie" [Basic Knowledge of Chemistry], C. Mortimer, Thieme, 7$^{th}$ Edition 2001 on pages 201 to 290. A Brönsted acid can also be used as a hardener.

The hardeners that can be used according to the invention are, by way of example, para-toluene sulfonic acid, morpholine, para-toluene sulfonic acid morpholine salts, alkylamide salts, amonium salts, morpholine-p-toluene sulfonate, ethanolamine hydrochloride, and mixtures thereof.

In a preferred embodiment, the impregnating resin composition contains the hardener in an amount of 0.1 to 1.0 wt.-%, preferably from 0.3 to 0.8 wt.-%, and particularly preferably from 0.5 to 0.6 wt.-% with regard to the solid resin content of the melamine-formaldehyde resin.

Practical tests have shown that although it is important that non-ionic agents are used for the wetting agent and release agent components in the impregnating resin composition according to the inventions the usual acid-releasing hardeners can be used without sacrificing quality.

As component e) the impregnating resin composition according to the invention contains polyhexamethylene guanidine (PHMG).

Polyhexamethylene guanidine (PHMG) is a polymeric guanidine compound, in particular a polymeric monoguanidine compound, and has as a structural element only monoguanidine groups, as exemplified below.

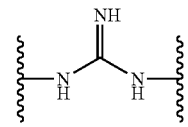 [SMILES: *NC(=N)N*]

Guanidines are iminoureas or carbamidines. They have a urea substructure. Guanidines or polymeric guanidine compounds are generally known to the person skilled in the art. The properties and preparation of guanidines or polymeric guanidine compounds are described, by way of example, in "Ullmanns Enzyklopäder der tochnischen Chemie" Volume 12, Verlag Chemie, GmbH, 1976, pages 411-419. The preparation of polyhexamethylene guanidine (PHMG) is, by way of example, described in WO 1999/054291 A1.

The guanidine groups contained in polyhexametnylene guanidine (PHMG) may also exist in charged form, particularly as cations in a salt with counter anion.

Polyhexamethylene guanidine (PHMG) has the structural formula (I).

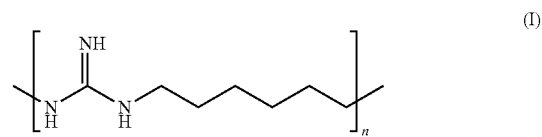

(I)

PHMG is commercially available. PHMG, by way of example, is available under CAS No 57028-96-3 (PHMG hydrochloride).

If here or elsewhere polyhexamethylene guanidine (PHMG) is mentioned, then this shall also mean any salts or other derivatives thereof. It is particularly advantageous if poly hexamethylene guanidine (PHMG) is present in a water soluble form, for example as a salt. Practical tests have shown that this allows a good incorporation or condensation of the polyhexamethylene guanidine (PHMG) in the melamine-formaldehyde structure.

The salts of polyhexamethylene guanidine (PHMG) also demonstrate a lower corrosive effect, so that the metal equipment used in preparing the impregnating resin composition and the resin coatings, laminates or impregnated products obtainable therefrom are protected and the range of applications is also improved. Independently of the lower corrosiveness, the preferred ions increase the environment friendliness of the product Cr its decomposition products.

Preferably, the polyhexamethylene guanidine (PHMG) is present as a salt, in particular as a water-soluble salt.

The salt of polyhexamethylene guanidine (PHMG) may be selected from the group consisting of hydrochloride, chloride, hydroxide, phosphate, fluoride, bromide, iodide, formate, acetate, diphosphate, sulphate, sulphide, sulphite, nitrate, thiocyanate, thiosulphate, carbonate, maleate, fumarate, tartrate, mesylate, gluconate and toluene sulfonate, wherein hydrochloride, chloride, hydroxide, phosphate, hydrogen phosphate, formate, citrate, diphosphate, acetate and carbonate are preferred. Particularly preferred is formlate, hydrochloride and/or chloride. It is particularly preferred if as the polyhexamethylene guanidine (PHMG) PHMG hydrochloride, (PHMG*HCl) is used.

A further advantage of the polyhexamethylene guanidine (PHMG) that can be used accordion to the invention is it can be used in a straightforward manner in common methods for impregnate- and/or laminate production. The water solubility of polyhexamethylene guanidine (PHMG) is of particular advantage. Liquids in general, and in particular aqueous solutions or suspensions, can be readily integrated in the normal process steps and equipment used in impregnate- and/or laminate production. There are a no elaborate intermediate steps or process interruptions required. Due to the water solubility of polyhezamethylone guanidine (PHMG) or its salts, no organic solvents have to be introduced in the impregnating resin composition according to the invention. Firstly, such solvents pose a fire hazard and secondly they constitute an additional, potentially harmful emission source.

Furthermore, it has been found that even small concentrations in the impregnating resin composition of the polyhexamethyene guanidine (PHMG) to be used according to the invention are sufficient to achieve the desired resistance to microorganisms in the processed products obtainable therefrom, by way of example in a resin coating, a laminate, or impregnate.

In a preferred embodiment, the impregnating resin composition has polyhexamethylene guanidine (PHMG) in an amount of 0.01 to 10 wt.-%, preferably from 1.0 to 5.0 wt.-% and particularly preferably from 1.0 to 3.0 wt.-%, with regard to the solid resin content of the melamine-formaldehyde resin.

Besides the components a) to e) described above, the impregnating resin composition according to the invention may contain further additives.

Thus, according to a preferred embodiment the impregnating resin composition contains one or more polyvalent alcohols.

Particularly preferred are $C_2$ to $C_{12}$ diols such as diethylene glycol, propylene glycol, 1,4-butanediol, butylene glycol, pentanediol, propanetriol and/or hexanediol, in particular diethylene glycol. The polyvalent alcohols are preferably used in an amount of 0.5 to 10 wt.-% preferably 1 to 5 and particularly preferably 3.5 to 5 wt.-%, with regard to the solid resin content of the melamine-formaldehyde resin. The aforementioned alcohols perform in particular the function of a plasticiser.

Further, the impregnating resin composition may contain plasticisers. Preferred plasticisers are selected from the group consisting of ε-caprolactam, paratoluene-sulphonamide and mixtures thereof. The plasticisers are preferably used in an amount of 0.1 to 10 wt.-%, preferably 0.5 to 3 wt.-% and particularly preferably 0.5 to 2.5 wt.-% with regard to the solid resin content of the melamine-formldehyde resin.

It has also been found that there is an advantageous effect on the results, the lower the level of anionic wetting agents and/or anionic release agents in the impregnating resin composition. Practical tests have shown that the anionic wetting agents and/or anionic release agents commonly employed in impregnating resin compositions in conjunction with the other components a), d) and e), in particular the polymeric guanidine compound e), lead to poorer results in terms of antimicrobial activity, mechanical and/or optical properties. Therefore, it is provided according to an embodiment of the invention that their use is minimised or that they are not used at all.

In a preferred embodiment, the impregnating resin composition has a maximum of 0.05 wt.-% anionic wetting adents, particular a maximum of 0.01 wt.-% anionic wetting agents, with regard to the solid resin content of the melamine-formaldehyde resin and/or a maximum of 0.05 wt.-% anionic release agent, in particular a maximum of 0.01 wt.-% anionic release agent, with regard to the solid resin content of the melamine-formaldehyde resin. The impregnating resin composition preferably comprises no anionic wetting agent and/or anionic release agent in other words, the impregnating resin composition of the invention preferably contains as a wetting agent exclusively a non-ionic wetting agent and/or as a release agent exclusively a non-ionic release agent.

In another embodiment, the impregnating resin composition may further contain a quaternary ammonium compound as an additional component f).

Preferably, the quaternary ammonium compound is selected from the group consisting of didecyldimethylammonium chloride (DDAC), dimethyloctadecyl [3-(trimethoxysilyl) propyl]ammonium, dimethyltetradecyl [3-(trimethoxysilyl) propyl]ammonium chloride, alkyl ($C_{12-18}$) (dimethylbenzyl ammonium chloride (ADBAC ($C_{12-18}$)), alkyl ($C_{12-16}$) dimethylbenzyl ammonium chloride (ADBAC/BKC ($C_{12-16}$), didecyldinemethylammonium chloride (DDAC ($C_{8-10}$)), alkyl $C_{12-14}$) dimethylbenzyl ammonium chloride (ADBAC ($C_{12-14}$)), and alkyl ($C_{12-14}$) ethylbenzyiammonium chloride (ADEBAC ($C_{12-14}$)), dialkyl ($C_{8-10}$) dimethyl ammonium chloride, and alkyl ($C_{12-14}$) dimethyl (ethylbenzyl) ammonium chloride.

Here, the quaternary ammonium compound may be contained in an amount of 0.01 to 3% by weight, preferably 0.1 to 2 wt.-% and particularly preferably 0.5 to 1 wt.-%, with regard to the solid resin content of the melamine-formaldehyde resin in the impregnating resin composition.

The invention further relates to a method for preparation of the impregnating resin composition according to the invention. The impregnating resin composition is obtained by mixing the components a) to e). The impregnating resin composition may be produce by common methods.

In an embodiment of the method, the melamine-formaldehyde resin is reacted as precondensate in an aqueous medium with melamine and formaldehyde solution. The polyhexamethlene guanidine (PHMG) can be added before, during, or after the reaction of the melamine with the formaldehyde. The polyhexamethylene guanidine (PHMG) is preferably added together with the plasticiser. Advantageously, the pH of the aqueous condensation phase is in the range of 3.2 to 9.7, preferably 8.4 to 9.4, in particular 8.8 to 9.3. The temperature range is preferably from 80 to 120° C. and particularly preferably from 95 to 103° C. The molar ratio of melamine to water is preferably 0.1 to 3.0, more preferably 0.1 to 2.8, and particularly preferably 0.1 to 2.5. In adjusting these ranges, water can it necessary be removed by distillation at atmospheric pressure. Melamine is most commonly used in solid form. Formaldehyde is commonly used in the form of concentrated aqueous solutions, for example 30 to 60 wt.-%—aqueous solution, preferably 40 to 45 wt.-% solution. Advantageously, the condensation reaction is carried out until the impregnating resin composition has a cloud point of 40 to 45' C.

The above mentioned substances can also be added. That stated above regarding components a) to e) or in relation to the abovementioned materials, respectively, also applies.

Another object of the invention is a coating obtainable by condensation of the impregnating resin composition according to the invention.

If "resin coating" is mentioned here, then this shall mean the wholly or partially hardened, that is to say condensed, impregnating resin composition according to the invention. Therefore, regarding the components and properties of the resin coating, that already stated regarding the inventive impregnating resin composition applies.

It has been found that the resin coating according to the invention meets the stringent quality requirements for surfaces in laminate production. In particular, resin coatings according to the invention exhibit almost complete transparency and/or maintain the high gloss of the laminate after application and hardening of the impregnating resin composition according to the invention. Moreover, practical tests have shown that the resin coating according to the invention has a standard-compliant micro-scratch resistance. This was measured by a modified Martindale test, which is standardized test method for determining the micro-scratch resistance of laminate flooring (DIN EN ISO 12947:04/1999 or IHD W 445 Version May 2007).

The resin coating according to the invention preferably contains the melamine-formaldehyde resin and polyhexamethylene guanidine (PHMG), the co-condensate thereof and/or the impregnating rosin composition described above. That already stated above applies to these components.

The condensation or hardening of the impregnating resin composition according to the invention to form the resin coating can take place under the influence of the hardener contained in the impregnating resin composition, elevated temperature and/or pressure. This may be the case, by way of example, during pre-drying of an impregnate, overlays, and/or compression into a laminate. It is also conceivable for a further condensation process to occur during storage of the impregnate, overlays, and/or a laminate. This can take place, by way of example, by the further presence or subsequent release of a hardener in the stored or already incorporated impregnate, overlay and/or laminate. That already stated above regarding condensation or hardening also applies.

Since the polyhexamethylene guanidine (PHMG) copolymerises during hardening in the melamine-formaldehyde matrix, the resin at according to one embodiment is characterised in that it comprises a co-condensate of the melamine-formaldehyde resin (component a)) and polyhexamethylene guanidine (PHMG) (component e)). That stated above applies respectively to the resin coating, and to the components a) to e). The resin coating may contain the additional substances or additives described above.

The resin coating may essentially consist in fell or in part of the co-condensate. The resin coating is preferably obtained by condensation or hardening. In particular, the resin coating is preferably obtained completely or partially by condensation or hardening of the impregnating resin composition according to the invention.

The resin coating may be present, by way of example as a coating, particularly as a melamine-formaldehyde lacquer or as what is known as a liquid overlay. The resin coating may be present as part of a laminate. But the resin coating may also contain a carrier material itself. In this embodiment, the resin coating can be present, by way of example, as an impregnate and/or part of a laminate.

In a preferred embodiment, the resin coating contains the following components:
  g) a co-condensate of melamine-formaldehyde resin and polyhexamethylene guanidine (PHMG);
  b) a non-ionic wetting agent;
  c) a non-ionic release agent; and
  d) a hardener.

In a particularly preferred embodiment, the component g) is a co-condensate of melamine-formaldehyde resin and PHMG-HCl.

In a further preferred embodiment, the resin coating has a thickness of 0.01 to 2 mm, preferably from 0.05 to 1 mm, and particularly preferably from 0.1 to 0.3 mm.

The impregnating resin composition and resin coating according to the invention can be used in wood-based material, impregnate and/or laminate production.

Another object of the invention is an impregnate containing
  i) the impregnating resin composition according to the invention or the resin coating according to the invention; and
  ii) an impregnate carrier material.

The term "impregnate" as used herein shall mean a storable product which, in particular, contains an absorbent impregnate carrier material, the has been coated, impregnated with or infiltrated by the impregnating resin composition according to the invention. Typically, an at least partially molecular layer of the (partially) hardened impregnating resin composition is located on the outermost layer or surface of the impregnate. But the impregnate can also be intentionally infiltrated, coated or impregnated in full or in part by the impregnating resin.

Surprisingly, it has been found that the impregnate according to the invention has excellent stability under external influences, while maintaining the required quality characteristics and antimicrobial activity.

The excellent storage stability of the impregnate is also advantageous. The impregnate exhibited no loss of quality during and after storage. This is an important aspect in laminate production, inter alia, since impregnates are typically manufactured separately and stored for a number of weeks in the interim before further processing into, for example, laminates. Therefore, such impregnates must not only continue to allow further processing after a number weeks, but in this case must also retain their antimicrobial properties since it has repeatedly been found in previous tests with other antimicrobial substances that simply during production and also during further processing these lose their antimicrobial action, it was surprising that the impregnate according to the invention can be firstly be easily processed after storage and secondly even following storage and/or further precessing had satisfactory antimicrobial properties.

The impregnate according to the invention comprises at least one layer i) on at least one of its main sides, which consists entirely or partially of the impregnating resin composition and/or the resin coating or contains this. If here or elsewhere "main sides" or "both main sides", or "one of the main sides" is mentioned, then this shall mean the top and bottom or at least the top and/or bottom of the impregnate carrier material, the impregnate or laminate. If here or elsewhere "top" is mentioned, then this shall mean the outermost side of the subsequent product. Accordingly, the "bottom" is the side opposite the top. By way of example, this means for the processing of a finished impregnate in laminate manufacture, that the top is the side which, with regard to the interior construction, is inwardly directed, whereas the bottom is directed towards the laminate carrier material.

Typically the impregnate is obtained in that an impregnate carrier material is infiltrated by, coated and/or impregnated with the impregnating resin composition according to the invention, before being dried or pre-dried under pressure and/or temperature to form the impregnate. The impregnating resin composition may be applied to the impregnate carrier material by spraying, dipping or rolling on at least one of the main sides of the impregnate carrier material. With the impregnate according to the invention, it is provided that the application of the impregnating resin composition is carried out directly on the impregnate carrier material. There is no prior coating with an impregnating or infiltration resin. The impregnation, infiltration or coating can also be carried out multiple times, wherein the layer i) may be optionally dried completely or partially, after each coating, impregnation and/or infiltration step. Under the effect of pressure and/or temperature following the impregnation, infiltration and/or coating, a full or partial hardening or condensing of the impregnating resin composition can take place, whereby the resin coating according to the invention can form in full or in part. Typically, the impregnates according to the invention are impregnated with and/or infiltrated by the impregnating resin formulation, so that at least ore of the main sides of the impregnate carrier material or both main sides of the impregnate carrier material comprise at least one molecular layer of the impregnating resin composition or, when this hardens, the resin coating. Further, at least after the coating, impregnation and/or infiltration, the impregnate comprises a molecular layer of the impregnating resin composition, or, if this hardens, the resin coating on its top. Even with an impregnate, which has been impregnated with the impregnating resin composition, despite the infiltration of the impregnate carrier material by the impregnating resin composition according to the invention or the resin coating obtainable therefrom an at least molecular layer of impregnating resin composition or the resin coating obtainable therefrom exists on one of the main faces of the impregnate carrier material. According to an embodiment of the impregnate according to the invention, on at least one of its main sides, the impregnate comprises a layer of impregnating resin composition according to the invention or resin coating according to the invention. In particular, this layer i) is located at least on the top of the impregnate carrier material or the impregnate. In a highly preferred embodiment, layer i) of the impregnate according to the invention is a liquid overlay, which consists of or contains in full or in part the impregnating resin composition and/or the resin coating.

In a further embodiment, the impregnate contains the impregnating resin composition or the resin coating in an amount from 30 to 600 wt.-%, from 350 to 550 wt.-%, or from 100 to 130 wt.-%, each with regard so the dry weight of the impregnate.

In another embodiment, the impregnate contains the impregnating resin composition or the resin coating in an amount of 10 g/m$^2$ to 250 g/m$^2$, preferably 50 g/m$^2$ to 150 g/m$^2$, and particularly preferably 30 g/m$^2$ to 120 g/m$^2$, with regard to one of the two surfaces of the impregnate.

After the impregnation, coating and/or drying steps, and before it is stored or further processed, the impregnate is adjusted to a defined residual moisture. According to an embodiment of the invention, the impregnate has a residual moisture content of preferably 2 to 8 wt.-%, particularly preferably 4 to 6 wt.-%.

The impregnate according to the invention comprises an impregnate carrier material. The impregnate carrier material preferably contains cellulose-containing and/or lignocellulosic material.

If here of elsewhere "cellulosic material" and/or "lignocellulisic material" is mentioned, then this shall mean any type of material which contains cellulose and/or lignacellulose. In the context of the invention, lignocellulose contains lignin as well as cellulose and/or hemicellulose. "Cellulose" is a straight-chain polysaccharide composed of several hundred to ten thousand collations units. These celloblose units in turn consist of two molecules of glucose, which are linked via a ß-1,4-glycosidic bond. "Hemicellulose" is a collective term for various constituents of plant cell walls. Hemicelluloses are branched polysaccharides with a short chain length—usually fewer than 500 sugar units—which as constructed from various sugar monomers. Hemicellulose is essentially composed of various sugar monomers such as for example glucose, xylose, arabinose, galactose and mannose, wherein the sugars may comprise acetyl and methyl-substituted groups. They have a random, amorphous structure and are easily hydrolysable. Xylose or arabinose consist predominantly of sugar monomers having five carbon atoms (pentoses). Mannese or galactose are mainly composed of glucose monomers having six carbon atoms (hexoses).

"Lignins" are amorphous, irregularly branched aromatic macromolecules which occur naturally as a component of cell walls and bring about the woodiness (ligtification) of the cell. They are composed of substituted phenylpropanol units, exhibit a lipophilic character and are insoluble at room temperature in neutral solvents such as water. Precursors of lignin are, by way of example, p-coumaryl alcohol, coniferyl alcohol and sinapyl alcohol. The molar masses of lignin are usually between 10,000 and 20,000 g/mol.

The cellulosic and/or lignocellulosic material may be particles, fibres or material containing the same. The lignocellulosic fibres are preferably wood fibres. These wood fibres are produced by fiberizaiion of wood particles, wood fibres, wood chips or fine-particle wood-based material. Preferred species of wood for the manufacture of a fibreboard obtainable by the method of the invention are, for example conifers, particularly pine and/or spruce. The cellulosic materials may be wood, or be derived from wood or cellulosic plants.

The impregnate carrier material of the impregnate according to the invention is preferably selected from the group consisting of paper, fleece, glass fleece, nonwoven fabric, knitted fabric, decor paper, overlay paper, cardboard, regenerated paper, core cardboard, paperboard and semi-chemical pulps.

"Paper" means a planar material with two main sides, i.e. a top and a bottom, to be defined by the four side edges, that consists essentially of cellulosic fibres usually of plant origin and formed by dewatering of a fibrous suspension on a sieve. The resulting nonwoven fabric is compressed and dried. Paper is usually produced from pulp or chemical pulp (from wood pulp) or also from waste paper. A "semi-chemical pulp" is a raw material for paper making which is made of wood and is mainly composed of cellulose, and amounts of lignin. It represents an intermediate stage between pulp and chemical pulp. Depending on the surface-related mass (known as the grammage) and the properties, a distinction is made between paper (7 $g/m^2$ to 225 $g/m^2$), cardboard (150 $g/m^2$ to 600 $g/m^2$), and paperboard (from 225 $g/m^2$). This distinction can be made according to DIN 6730. In particular, papers, cardboard and/or carton are absorbent impregnate carrier materials. These are preferably able to absorb up to 7 times their dry weight of the impregnating resin composition. A decorative paper is a printed or coloured special paper which can be used for decorative coating of wood-based materials. An overlay paper is generally an at least partially to totally transparent (thin) paper which, by way of example, offers a view of the underlying decorative paper or impregnate carrier material, for a laminate panel. Overlay and/or decorative papers are often provided in practice in the form of impregnates as a finished product on their own or in combination with one another.

Another object of the invention is a laminate comprising
iii. at least, one laminate carrier material; and
iv, the impregnate according to the invention or the resin coating according to the invention or the impregnating resin composition according to the invention.

"Laminate," as used herein, refers to a product comprising on least two layers flat-bonded together. These at least two layers may be of same or different materials. In general, one of these layers consists of a laminate carrier material iii) to which the impregnate according to the invention, the resin coating according to the invention or the impregnating resin composition iv) according to the invention is applied as second layer.

Laminates offer versatlity in house building, particularly for the interior and furniture construction, by way of example, as wall elements for the exterior or interior, as laminate flooring, or for front and rear surfaces of furniture. The laminates used for this purpose are usually cuboid flat products with at least two layers, which are defined by six surfaces: four edge faces and a top and bottom, wherein the top and bottom are referred to together here, as opposed to the edge surfaces, as the "main sides" or "surfaces of the laminate". In interior construction, the top means the inward-facing side. In laminates used as floor panels, "top" means the side which is stepped on and seen by the user once the laminate panels have been laid. Thus, the "top" is distinct from the "bottom" which in interior construction rests on the substructure or floor.

Stringent requirements apply with regard to the properties influencing the optical appearance or properties of the covering layer of laminates. These include, for example, abrasion resistance, hardness, transparency, gloss, colour fastness and light stability. The top layer of laminates ("covering layer") is often designed such that it allows the underlying decor paper (if present) or laminate carrier material to be seen, and is thus highly transparent, but is still sufficiently hard and abrasion-resistant. Surprisingly, the laminate according to the invention meets these requirements. In practical tests it has been shown that the laminate according to the invention has excellent resistance and a long-lasting antimicrobial effect. This was surprising since it could not be foreseen that, on the one and, despite the copolymerisation of the polymeric guanidine compound a durable scratch-resistant surface coating would form and, on the other, that the antimicrobial effect would be maintained. Furthermore, it was also found that when the laminate according to the invention is used in furniture construction or as a floor covering, it can withstand the high stresses of everyday use. In particular, the top layer of the laminate is resistant to micro-scratches and despite the everyday stresses maintains its very high transparency and light stability, so that the desired view of the underlying decorative laminate or carrier material is fully maintained.

The laminates according to the invention have a layered configuration wherein in interior construction, it is usually the top layer that is formed by the impregnate according to the invention. Here, the layer i) of the impregnate forms the top layer of the laminate. This top layer is also referred to herein as a "covering layer". The function of this covering layer is to withstand the high external stress and yet maintain through very high transparency and light stability the view of the underlying decorative or laminate carrier material. Because the laminate comprises the impregnate according to the invention or the resin coating according to the invention, the covering layer contains a coating comprising the impregnating resin composition according to the invention or the resin coating according to the invention, or consists wholly thereof. In particular, the covering layer may be the resin coating in the form of a liquid overlay or in the form of a melamine-formaldehyde lacquer. Below the cover layer, a decorative paper can also be present which can similarly contain the wholly or partially hardened impregnating resin composition according to the invention.

As a further layer laminates according to the invention comprise a laminate carrier material iii), on the top of which the impregnate according to the invention is applied. As a further layer laminates according to the invention can comprise, in particular on the underside of the laminate carrier material, what is known as a return or backing layer. The return or the backing layer is there to ensure that the laminate does not deform under load by the bending forces occurring. The return, or the backing layer can, by was of example, be present in the form of a paper or plastic layer.

The laminate according to the invention comprises at least a laminate carrier material. The laminate carrier material preferably comprises cellulosic and/or lignocellulosic material.

The at least one laminate carrier material can in this case be selected from the group consisting of paper, paperboard, decorative paper, cardboard, core cardboard, semi-chemical pulps, fleece, nonwoven fabric, knitted fabric, wood, wood-based materials and solid wood panels. Conceivably and usually, the laminate backing material may also contain combinations of several of the aforementioned materials.

According to an embodiment, the laminate carrier material is a wood-based material panel. The laminate carrier material may be a wood-based material. Preferred wood-based materials are particle board or fibreboard. If here or elsewhere, "panel" is mentioned, this shall mean a cuboid flat product, which is defined by six surfaces: four edge faces and a top and bottom, wherein the top and bottom and collectively referred to, as distinct from the edge surfaces, as the "main sides" or "surfaces of the panel". However, as the laminate carrier material, one or more impregnates or paper webs impregnated with, infiltrated by, or coated with impregnating resin, may also be used in laminates according to the invention.

According to the invention, the term "wood-based materials" means various materials consisting of wood or containing wood. Examples of wood-based materials in the context of the invention are wood panels, laminates, flooring, worktops, table tops, pallets and/or wood mouldings, particularly composites of individual wood particles. Such wood particles or structural elements can be the product of any commutation of cellulose-containing materials, such as wood particles, in particular wood chips, finely divided wood-based material, wood strands, wood fibres, wood chips and/or wood veneers. Wood-based materials within the meaning of this invention are in particular those with a solid wood base, veneer materials, chip materials, fibre materials, fibreboards or other composites. A general overview of the product group of wood-based materials can be found, by way of example, in "Taschenbuch der Holztechnik" [*Handbook of Wood Technology*], A. Wagenführ, F. Scholz, Carl Hanser Verlag, $2^{nd}$ Edition, 2012 on pages 123 to 0130.

In an embodiment, the laminate carrier material may be a fibreboard. Different types of fibreboard are known to the person skilled in the art. These are, for example, described in "Taschenbuch der Holzrechnik" by A. Wagenfür and F. Scholz, Hanser Verlag, 2012 on pages 146 to 149, Wood chip board (chipboard in a broad sense) denotes a group of products in the field of wood-based materials, which are produced from wood particles and a binder by means of heat and pressure. Examples include chipboards, laminated particle boards, single-layer boards, multi-layer boards, light flat pressed boards, extruded sheets, extruded tube plates (ET—Extruded Tubulars), extruded plain sheets (ES—Extruded Solid), plastic-coated decorative flat pressed boards (MFB—Melamine Faced Board), chipboard mouldings or Oriented Strand Board (OSB). The classification of chipboard can be made according no DIN EN 312, wherein chipboards may be distinguished by their strength and moisture resistance. COB may be classified according to EN 300 depending on their use. Such particle board may, by way of example, be processed into laminates, flooring, countertops, table tops, pallets and/or wood mouldings. Wood-based materials, their manufacture and the requirements of these are also described in "Taschenbuch der Holztechnik", A. Wagenführ, F. Scholz, Carl Hansen Verlag, $2^{nd}$ Edition 2012, pages 113 to 116.

In another embodiment, the laminate carrier material can also be a fibreboard, such as a medium density (MDF) or high density (HDF) fibreboard. Unlike wood-based materials, the wood used for the production of fibreboards is restricted to wood fibre, fibre bundles or fibre fragments. The structural integrity of the fibreboard is mainly due to the felting of the wood fibres and their inherent wood bonding forces, but adhesives can also be used as binders. The fibre is produced from woody plant material. This is done by chopping the raw material, followed by steaming, boiling, and chemical and/or mechanical maceration into single fibres, fibre bundles or fibre fragments. Regarding the manufacturing method, the person skilled is the art will make a distinction between the wet process (sedimentation of the fibres from an aqueous fibre suspension to form the fleece) and the dry method (dry fibres are mechanically or pneumatically compressed to form a fleece). When the fibreboards are produced in the wet process, a distinction is made between porous, medium-hard and hard fibreboard. When the fibreboards are produced in a dry process, a distinction is made between medium-density and high-density fibreboard, with gypsum-bonded fibreboards also belonging to this group. The resulting fleeces are then compressed. The compression, as used here, is usually performed by hot compression of the layers to the laminate in which the composition according to the invention that has not yet fully hardened then continues to condense or harden.

Particularly preferably, the fibreboard used for the laminate is a DHF, LDF, MDF or HDF board. The person skilled in the art will understand a DHF board to be a breathable and moisture-resistant fibreboard. The person skilled in the art will understand LDF, MDF and HDF board, as fibreboard of low ("Low Density"), medium ("Medium Density") and high ("High Density") density. Fibreboard in the LDF range has a density of 250 to 150 kg/m$^3$, in the MDF range of 550 to 750 kg/m$^3$ and in the HDF range of 300 to 1,000 kg/m$^3$.

In a particularly preferred embodiment, the fibreboard is a DHF board. The DHF board according to the invention preferably complies with standard EN 14964:2007-01.

In an embodiment of the invention, the bulk density of the fibreboard is 500 to 700 kg/m$^3$, preferably 550 to 650 kg/m$^3$ and most preferably 580 to 625 kg/m$^3$. The bulk densities can be determined in accordance with EN 323:93-08.

In a further embodiment, the fibreboard has a thickness of 8 to 30 mm, preferably from 10 to 22 mm and particularly preferably from 12 to 20 mm.

In an embodiment of the invention, the bulk density of the chipboard is 500 to 780 kg/m$^3$, preferably 550 to 650 kg/m$^3$ and most preferably 580 to 625 kg/m$^3$. The bulk densities are determined in accordance with EN 323:93-08.

In a further embodiment, the fibreboard has a thickness of 8 to 40 mm, preferably from 10 to 32 mm and particularly preferably from 12 to 25 mm.

In a further embodiment, the fibreboard or chipboard or the subsequent laminate has at least one form-fitting or force-fitting connection element, in particular a groove and/or spring. To that end, at least one of the edge surfaces may be configured such that it can be connected to another edge surface of another board. The connection is preferably a nut-feather connection or tongue-and-groove connection. It is particularly preferred if the nut, feather and/or tongue and groove is round, oval, conical or angular in design. There is preferably an interlocking joint between the boards. Particularly preferably, there is an interlocking connection perpendicular to the board plane.

Such nut-feather connections or tongue-and-groove connections will in essentially be known to the person skilled in the art. A nut-feather connection or tongue-and-groove connection is a connection that is put together or joined together at its edge surfaces or edges. With the nut-feather connection, the two boards to be joined can each have a nut at the edge surfaces or edges, into which a so-called feather is inserted or placed as the connecting third component. However, it is also conceivable that one edge surface or edge of the boards to be jointed has at least one not and the other edge surface or edge has at least one feather. In a particular embodiment, the fibreboard has a nut on at least one edge surface and a feather on at least one other edge surface. In the tongue-and-groove connection, a feather may be incorporated across half the width of the edge of one of the two components to be jointed.

In a further embodiment, the laminate is a wood-based material, which is directly coated with the resin coating. In another embodiment, the laminate is a wood-based material, which is pressed with at least one impregnate. In particular, the impregnate may be an impregnated decorative paper. Alternatively or in addition, the embodiments mentioned may also have a separately applied outer layer (known as an overlay or finishing layer) containing the impregnating resin composition according to the invention or the resin coating.

According to another embodiment of the invention, the laminate is one which contains the impregnate according to the invention and contains one, and preferably a plurality of, layer(s) of paper infiltrated by the impregnating resin, in particular the impregnating resin composition, which have been joined together under high pressure. Such a laminate which has been made from a plurality of layers of paper, in particular infiltrated with the impregnating resin composition, and having a thickness of 2 mm or more, is referred to herein as a compact board. Alternatively or additionally, the laminate can also comprise a separately applied outer layer (known as an overlay or finishing layer), containing the composition or resin coating according to the invention. The laminates for the purposes of this invention include, in addition to the compact boards, in particular HPL ("High Pressure Laminates") and CPL ("Continuous Pressing Laminates").

A further embodiment of the laminate according to the invention concerns a laminated floor panel, which is used for example in the field of flooring, and having on the top a layer of the impregnating resin composition according to the invention or the resin coating according to the invention. Preferably, this laminate panel comprises as the laminate carrier material, a wood-based material board, in particular a fibreboard, to which an inventive impregnate is applied. That already stated above applies to the laminate carrier material and the impregnate. Preferably, the wood-based material panel is a chipboard, MDF or HDF board. Preferably, the impregnate is an impregnated decorative paper. Laminates in the form of a floor panel can in particular have the following layer structure (the sequence is defined starting from the top): 1. Covering layer (layer 1) of the impregnate, for example, the resin coating according to the invention, in particular in the form of a melamine-formaldehyde lacquer or liquid overlay or inventive impregnate; 2. Optional decorative paper 3; Optional underlay; 4. Carrier material (e.g. a support plate); 5. Optional return; and 6. Optional installation support.

In this embodiment as a floor panel, based on typical laminate flooring panels, the decor paper is typically the visually perceived surface on which for example motifs may be printed. It is on this decorative paper that the transparent resin coating can be found. However, it is also possible to print directly on the laminate carrier material or layers positioned on top of this, and apply to this the impregnating resin composition or the resin coating. Laminates according to the invention can optionally comprise an underlay (for example, what is known as a Kraft paper). Preferably, this is positioned beneath the decorative paper sheet. An underlay is, for example, as a rule used in laminate flooring panels in high stress classes. The stress classes of laminate flooring are regulated, for example by EN 13329. Laminate floors in the lower stress classes do not usually employ underlay. Underlays can also be impregnated with, infiltrated by or coated with the impregnating resin composition according to the invention. According to this embodiment, of the invention the laminates are also highly resilient and have antimicrobial properties on their underside.

Thus, by way of example, a laminate typically used as a floor panel comprises at least the following layers: paper as backing layer, (carrier material) wood-based material board, decorative paper and overlay paper impregnated with an impregnating resin and/or a surface resin coating.

The underlay may in particular be a flexible underlay. This may be applied to the return, or the backing layer and/or underside of the laminated carrier material. By was of example, cork layers for walking and/or impact sound insulation, as well as underlays of polystyrene, polyethylene, polypropylene, polyurethane foams or cellulose fibres can be considered here.

The production of such laminate panels as a floor covering or laminates for furniture are known to the person skilled in the art. Here, the decorative and/or overlay paper is usually impregnated with, infiltrated by or coated with the impregnating resin beforehand and subsequently dried. Rolled into long strips, this impregnate can be stored as a precursor. In particular, the impregnate containing the (carrier material) wood-based material board, the decor and/or overlay paper is then applied to the top of the carrier material. For this work step lasers are generally used to align the impregnates, so that no variation in decorative image occurs during subsequent laying. But it is also conceivable that the laminate carrier material, in particular the (carrier material) wood-base material board, instead of a decorative and/or overlay paper is coated with just a liquid overlay. In most cases, simultaneously with the application of the decorative and/or overlay paper containing the impregnate, a return or a backing layer is applied to the underside of the laminate carrier material, in particular the (carrier) wood-based material board. Optionally, in the production of, by way of example, floor panels or laminates for furniture manufacture, in a further work step a nut and feather, or profiles may be milled into the edges of the laminate panels with a plurality of milling heads, which can be used for subsequent connection of the individual floor panels or furniture parts.

In laminates for the production of furniture, the laminate carrier material, in particular wood-based material board or solid wood panel, or the laminate, may be coated on its main sides and optionally also at its edges with a layer of impregnating resin composition according to the invention or a resin coating according to the invention. In these embodiments, the resin coating according to the invention may, in particular, be a melamine-formaldehyde lacquer layer. As described above, the composition according to the invention or the resin coating obtainable therefrom can also function as an antimicrobial coating layer. To this end, the composition according to the invention or the resin coating can contain the additives known to the person skilled in the art from melamine formaldehyde paint production. In particular, the composition according to the invention or the resin coating according to the invention may contain colour pigments.

A further object of the invention is a method for producing a laminate, comprising the steps of
  i) applying the impregnating resin composition according to the invention, the resin coating according to the invention or an impregnate according to the invention onto a laminate carrier material; and
  ii) compressing the components from step i.

The application of the impregnating resin composition or the resin coating or impregnate in step i) can be performed using the methods common in the wood and paper processing industry. The application of the impregnating resin composition onto the laminate carrier material may be performed, by way of example, by spraying, dipping or rolling. The resin coating may be applied such that first impregnating resin composition is applied, and this is then hardened in full or in part under temperature, pressure and/or with the addition of further hardener. The method according to the invention provides that the application of the impregnating resin composition takes place directly onto the laminate carrier material. There is no previous coating with an impregnating or infiltration resin. The application of the impregnate can be performed by applying the impregnate to the laminate carrier material.

It is also conceivable that at least one of the additional layers already detailed is present between the impregnating resin composition, the resin coating or the impregnate, and the laminate carrier material. That already stated above applies here.

The compressing of the components from step i) in step ii) may be carried out by the methods common in the wood and paper processing industry.

Here, typically the at least two layers are joined by compression under elevated pressure and/or elevated temperature. Here, the impregnating resin composition or the resin coating liquefies briefly and then reacts by way of a polycondensation to form the finished laminate that is permanently connected with the further layer.

Before compression, the either directly applied impregnating resin composition or the resin coating or the impregnate is dried to a certain residual moisture, preferably 2 to 6 wt.-%, particularly preferably 4 to 6 wt.-%.

Suitable temperatures for the compression are temperatures of 150° C. to 250° C., preferably from 160° C. to 240° C., particularly preferably from 180° C. to 230° C. At temperatures in these ranges, the method can be carried out particularly economically. Optimal results can be achieved if the compression is performed at a compression temperature of at least approximately 150° C.

The compression speed during the hot compression on continuous twin-belt presses is in particular 400 mm/s, preferably 450 mm/s, and particularly preferably 500 m/s.

For economic and process engineering reasons it has proven to be advantageous if during compression a specific pressure (active pressure on the board surface) of 50 to 300 N/cm$^2$ is used. Such pressures ensure particularly good adhesion of the layers of the laminate to one another. Moreover, a high strength of the laminate can be achieved with such a compression pressure.

In an embodiment of the invention, the method comprises the additional step of
iii) degreasing at least one of the surfaces of the laminate or impregnate.

It is preferable for the surface of the laminate or impregnate that is degreased, to be the surface containing the impregnating resin composition according to the invention, the resin coating according to the invention or the impregnate according to the invention.

Surprisingly, it has been found that degreasing the surface in the course of the production of a laminate according to the invention leads to a further improvement in the antimicrobial properties.

The options for degreasing surfaces will be generally known to person skilled in the art. This may be done, by way of example, by treatment with a detergent capable of dissolving hydrophobic substances such as fats. The cleaning agent may contain or consist of an organic solvent. In particular, the surfaces can be brought into contact with an organic solvent and then abraded.

Preferred organic solvents are selected from the group consisting of alcohols, ethers, aldehydes and ketones. In practice, good results have been obtained in the degreasing of the surface in step iii), by way of example, with ethanol, isopropanol, acetone or their ethers as the solvent.

The invention will be described in more detail in the following by way of example, using exemplary embodiments.

EXAMPLE 1: PREPARATION OF AN IMPREGNATING RESIN COMPOSITION

In this example, an impregnating resin composition within the meaning of the invention is prepared as follows:

Materials

| | |
|---|---|
| 2,780 g | of melamine-formaldehyde impregnating resin 62% solid resin content |
| 345 g | PHMG-HCl 25% aqueous solution |
| 14.5 g | hardener MH836 Fa. INEOS Melamines |
| 5.0 g | of non-ionic wetting agent Deurowet MA 21 |
| 2.5 g | of non-ionic release agent Deurolease PHE |

The material listed above were blended together in a 5 l three-necked flask at 25° C. with agitation and intimately mixed for 15 minutes.

The composition had a solids content of 57.9 wt.-% as measured by the oven drying method (1 g sample weight for 2 hours at 120° C. dry) and a turbidity time of 160 s at 100° C. in a boiling water bath.

EXAMPLE 2: PREPARATION OF AN IMPREGNATE

An impregnate was then prepared with the impregnating resin composition from Example 1.

A decorative paper with a grammar of 65 g/m was impregnated with 65 g/m$^2$ of the impregnating resin composition from Example 1 using a hand squeegee device from CHM GmbH Automatisierungstechnik. After coating with resin, the impregnate was dried for 3 minutes at 120° C. in a convection oven. The residual moisture of the impregnate was 6 wt.-%.

EXAMPLE 3: PREPARATION OF A LAMINATE

The impregnate from Example 2 was compressed onto a 7.4 mm HDF carrier board (50×50 cm) at 192° C. under a pressure of 60 bar within 23 s. A backing layer paper was attached to the underside of the carrier board to ensure flatness.

EXAMPLE 4: ANTIMICROBIAL EFFECT OF THE LAMINATE OF EXAMPLE 3

Checking for antimicrobial effectiveness typically takes place u sing in vitro tests. Since each material has inherently different characteristics in terms of adhesion of germs, the antimicrobial activity is always measured as a difference compared to a corresponding non-antimicrobial zero sample. Common test methods are JIS Z 2801 (ISO 22196, ASTM E 2180 and the Certika test.

To test the antimicrobial effectiveness in the present case laminate samples from Example 3 were investigated using the dry-inoculation method (Rodeo method) in accordance with the Microbiological Quality Standard 22 and compared to an active-substance-free reference.

Rodac method for various surfaces
Material:
Test surfaces
Test germ: S. aureus ATCC 6538
Sterile water (distilled water)
Ethanol 70%, 96%
Pure acetone
Disposable wipes
Sterile swab sticks
Densicheok Plus (Fa. bioMerieox).
Sterilised spreader rod
Pipettes
Sterile pipette tips
Columbia agar+5% sheep blood agar plates (90 mm)
Columbia agar+5% sheep blood contact plates (Fa. Oxoid) BD Columbia Agar with 5% sheep blood is a nutrient-rich multipurpose medium for the isolation and cultivation of demanding and undemandlng microorganisms from clinical samples. The excellent growth-supporting properties of Columbia agar with 5% sheep blood are the result of the combination of two peptones and yeast extract as a source of vitamin E complex. The corn starch also contained absorbs toxic by-products of the sample and serves as an energy source for organisms with alpha-amylase. The sheep blood serves to detect haemolytic reactions and supplies the factor X (heme), essential for the growth of many pathogenic species. The colonies are larger and the growth is more pronounced on this medium than on other blood agar media.

In many European countries BD Columbia III Agar with 5% sheep blood is the most used initial isolation medium for clinical samples.

Reagents of Usable Plate Medium
(Composition per litre of distilled water, pH 7.3±0.2)

| | |
|---|---|
| Pancreatic digest of casein | 12.0 g |
| Peptic digest of animal tissue | 5.0 g |
| Yeast extract | 3.0 g |
| Beef extract | 3.0 g |
| Corn starch | 1.0 g |
| Sodium chloride | 5.0 g |
| Agar | 13.5 g |
| Growth factors | 4.0 g |
| Defibrinated sheep blood | 5.0% |

Inoculum:
From the agar plate, some material was removed from a 24 h S. aureus culture using a sterile swab rod and a suspension prepared in 10 ml of sterile distilled water. The density of the suspension was adjusted using the "Densicheck lus" device (biomériex) to a turbidity, according, to McFarland, of 0.5 (corresponds to a density of 1.5×10^8 KBE/ml). Then, the suspension was diluted by means of a 1:1000 dilution step to 10^5 CFU/ml with sterile distilled water (test inoculum). The inoculum was checked by plating 10 µl and 100 µl of inoculum onto blood agar plate (extrapolation of CFU).

Test Surfaces:
The test surfaces were each divided into 2 sections. Prior to contamination of the surfaces a portion was treated respectively with sterile distilled water, and 70% ethanol (by wiping with a disposable wipe). Then, the test areas were marked with circles. To each portion respectively at 3 marked positions, 10 µl of test inoculum was pipetted. The droplets were then plated using a sterilised spreader rod on the marked surface.

Incubation and Evaluation
After each plating the sterilised spreader rod was immersed in 96% alcohol and flamed. After drying of the suspension at room temperature (10 min, in the laminar flow) a surface marking of the marked position by means of Columbia sheep blood 5%—agar contact plate (application of the contact plate for 5 seconds) was carried out immediately after drying (0 h) after 3 h and after 5 h.

The contact plates were incubated at 35±2° C. for 24 h (without humidity chamber), and then assessed by counting the colonies or a visual assessment of the growth was carried out.

TABLE 1

Colony forming units (CFU) S. aureus ATCC 6538 after 24 h of incubation at 35 ± 2° C. of the samples. Samples were taken after 0 h, 1 h, 3 h, and contact time of the germ with the test surface (St. = reference) and PHMG (sample from Example 3).
S. aureus CFU/10 µl

| Time (in hours h) | St. (Reference) | PHMG (Sample from Example 3) |
|---|---|---|
| 0 | More than $10^4$ | Fewer than $10^3$ |
| 1 | More than $10^3$ | 109 |
| 3 | 840 | 90 |

CFU = colony-forming units.

In the treated PHMG laminate here was a very distinct reduction in bacteria from initially fewer than $10^3$ colony forming units to only 90 colony forming units.

TABLE 2

Colony forming units (CFU) E. coli after 24 h of incubation at 35 ± 2° C. of the samples. Samples were taken after 0 h, 1 h and 3 h contact time of the germ with the test surface (St. = reference) and PHMG (sample from Example 3).
E.coli CFU/10 µl

| Time (in hours h) | St. (Reference) | PHMG (Sample from Example 3) |
|---|---|---|
| 0 | More than $10^4$ | More than $10^4$ |
| 1 | More than $10^3$ | More than $10^3$ |
| 3 | More than $10^3$ | 108 |

CFU = Colony Forming Units.

In the laminate treated with PHMG there was a very distinct reduction in bacteria from initially more than $10^4$ colony forming units to only 108 colony forming units.

The invention claimed is:
1. An impregnating resin composition comprising
   a) a melamine-formaldehyde resin;
   b) a non-ionic wetting agent;
   c) a non-ionic release agent;
   d) a hardener; and
   e) polyhexamethylene guanidine (PHMG),
   wherein the melamine-formaldehyde resin and polyhexamethylene guanidine (PHMG) form a co-condensate.
2. The impregnating resin composition according to claim 1, characterised in that
   i. the non-ionic wetting agent is selected from the group consisting of polyalkylene glycol ethers, alkyl polyglucosides, and nonyl phenol ethoxylates and fatty alcohol ethoxylates, and mixtures thereof;
   ii. the non-ionic release agent is selected from the group consisting of fatty acid glycerides, ethoxylated fatty alcohols, and higher fatty acid phosphate esters, and mixtures thereof; and/or iii. the hardener is selected from the group consisting of para-toluene sulfonic acid, morpholine, para-toluene sulfonic acid morpholine salts, alkylamine salts, ammonium salts, morpholine-p-toluene sulfonate, ethanolamine hydrochloride and mixtures thereof.

3. The impregnating resin composition according to claim 1, characterised in that the impregnating resin composition contains one or more of the components a) to e) in the following amounts:
   a) the melamine-formaldehyde resin in an amount of 25 to 60 wt.-%, in relation to the total weight of the impregnating resin composition;
   b) the non-ionic wetting agent in an amount of 0.1 to 3 wt.-%, in relation to the solid resin content of the melamine-formaldehyde resin;
   c) the non-ionic release agent in an amount of 0.1 to 1.0 wt.-%, in relation to the solid resin content of the melamine-formaldehyde resin;
   d) the hardener in an amount of 0.1 to 1.0 wt.-%, in relation to the solid resin content of the melamine-formaldehyde resin; and/or
   e) polyhexamethylene guanidine (PHMG) in an amount of 0.01 to 10 wt.-%, in relation to the solid resin content of the melamine-formaldehyde resin.

4. A resin coating comprising an impregnating resin composition according to claim 1.

5. The resin coating according to claim 4, characterised in that the resin coating has a thickness of 0.01 to 2 mm, preferably from 0.05 to 1 mm, and particularly preferably from 0.1 to 0.3 mm.

6. An impregnate containing
   i. an impregnating resin composition according to claim 1, and
   ii. at least one impregnate carrier material.

7. The impregnate according to claim 6, characterised in that the impregnate contains the impregnating resin composition according to claim 1 in an amount of
   i. 30 to 600 wt.-%, 350 to 550 wt.-%, or 100 to 180 wt.-%, each in relation to the dry weight of the impregnate; or
   ii. 10 g/m$^2$ to 250 g/m$^2$, preferably 50 g/m$^2$ to 150 g/m$^2$, and particularly preferably 80 g/m$^2$ to 120 g/m$^2$, in relation in each case to one of the two surfaces of the impregnate.

8. The impregnate according to claim 6, characterised in that the at least one impregnate carrier material is selected from the group consisting of paper, fleece, glass fleece, nonwoven fabric, knitted fabric, decorative paper, overlay paper, cardboard, regenerated paper, core cardboard, paperboard and semi-chemical pulps.

9. A laminate comprising
   the resin coating according to claim 4.

10. The laminate according to claim 9, characterised in that the at least one laminate carrier material is selected from the group consisting of paper, fleece, nonwoven fabric, knitted fabrics, decorative paper, cardboard, core cardboard, paperboard, semi-chemical pulps, wood, wood-based material and solid wood panels or a combination thereof.

11. The laminate according to claim 9 for furniture, floor, wall and/or ceiling construction, characterised in that the surface of the laminate that is directed towards the room interior, contains the resin coating.

12. A method for producing a laminate according to claim 9, comprising the steps of
   i. applying an impregnate to a laminate carrier material;
   ii. compressing the components from step i wherein the impregnate contains
   i. an impregnating resin composition comprising
      a) a melamine-formaldehyde resin;
      b) a non-ionic wetting agent;
      c) a non-ionic release agent;
      d) a hardener; and
      e) polyhexamethylene guanidine (PHMG), wherein the melamine-formaldehyde resin and polyhexamethylene guanidine (PHMG) form a co-condensate and
   ii. at least one impregnate carrier material.

13. The method for manufacturing a laminate according to claim 12, further comprising the step of
   iii. degreasing at least one of the surfaces of the laminate.

14. A wood-based material comprising an impregnating resin composition of claim 1.

15. The impregnating composition according to claim 1, characterised in that the impregnating resin composition contains one or more of the components a) to e) in the following amounts:
   a) the melamine-formaldehyde resin in an amount of 25 to 60 wt.-%, in relation to the total weight of the impregnating resin composition;
   b) the non-ionic wetting agent in an amount of 0.2 to 1.0 wt.-%, in relation to the solid resin content of the melamine-formaldehyde resin;
   c) the non-ionic release agent in an amount of 0.2 to 0.5 wt.-%, in relation to the solid resin content of the melamine-formaldehyde resin;
   d) the hardener in an amount of 0.3 to 0.8 wt.-%, in relation to the solid resin content of the melamine-formaldehyde resin; and/or
   e) polyhexamethylene guanidine (PHMG) in an amount of 1.0 to 5.0 wt.-%, in relation to the solid resin content of the melamine-formaldehyde resin.

16. The impregnating composition according to claim 1, characterised in that the impregnating resin composition contains one or more of the components a) to e) in the following amounts:
   a) the melamine-formaldehyde resin in an amount of 25 to 60 wt.-%, in relation to the total weight of the impregnating resin composition;
   b) the non-ionic wetting agent in an amount of 0.2 to 0.4 wt.-%, in relation to the solid resin content of the melamine-formaldehyde resin;
   c) the non-ionic release agent in an amount of 0.2 to 0.4 wt.-%, in relation to the solid resin content of the melamine-formaldehyde resin;
   d) the hardener in an amount of 0.5 to 0.6 wt.-%, in relation to the solid resin content of the melamine-formaldehyde resin; and/or
   e) polyhexamethylene guanidine (PHMG) in an amount of 1.0 to 3.0 wt.-%, in relation to the solid resin content of the melamine-formaldehyde.

* * * * *